US012718132B2

(12) United States Patent
Stefanski et al.

(10) Patent No.: US 12,718,132 B2
(45) Date of Patent: Aug. 25, 2026

(54) SYSTEMS AND METHODS FOR ENCODING AND MEASURING AN ESTIMATED VALUE FROM A DISCRETE SINC QUANTUM STATE

(71) Applicant: Wells Fargo Bank, N.A., San Francisco, CA (US)

(72) Inventors: Charlee Alexandra Stefanski, New York, NY (US); Vanio Markov, New York, NY (US); Constantin Gonciulea, Summit, NJ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 561 days.

(21) Appl. No.: 18/450,830

(22) Filed: Aug. 16, 2023

(65) Prior Publication Data

US 2025/0061364 A1 Feb. 20, 2025

(51) Int. Cl.
*G06N 10/40* (2022.01)

(52) U.S. Cl.
CPC .................................... *G06N 10/40* (2022.01)

(58) Field of Classification Search
None
See application file for complete search history.

(56) References Cited

U.S. PATENT DOCUMENTS 10,439,808 B2 * 10/2019 Alleaume ............ H04L 9/0852
10,565,514 B2 * 2/2020 La Cour .................. G06F 7/50
10,810,665 B2 * 10/2020 Woerner ................ G06N 10/20
11,657,312 B2 * 5/2023 Akhalwaya ............ G06F 17/11 706/12
12,423,607 B2 * 9/2025 O'Brien .................... G06F 5/01
12,424,302 B2 * 9/2025 Niroula .................. G16C 20/90
12,572,832 B2 * 3/2026 Klimov .................. G06N 10/20
2006/0224547 A1 * 10/2006 Ulyanov ............... B82Y 10/00 706/2

(Continued)

OTHER PUBLICATIONS

Charlee Stefanski, Vanio Markov, and Constantin Gonciulea. Quantum amplitude interpolation, 2022. URL https://arxiv.org/abs/2203.08758.

(Continued)

*Primary Examiner* — Maikhanh Nguyen
(74) *Attorney, Agent, or Firm* — K&L Gates LLP

(57) ABSTRACT

Systems, apparatuses, methods, and computer program products are disclosed for encoding and measuring an estimated value from a discrete sinc quantum state. An example method includes encoding a discrete sinc quantum state representing a real value t, where amplitudes of the discrete sinc quantum state are described by an amplitude expression including a $\text{sincd}_{\pi,n}$ function, t is bounded by (k, k+1) and k is bounded by $[0, 2^n)$. The example method further includes performing an ensemble of measurements of the discrete sinc quantum state to obtain a measured floor and ceiling of t and a ratio r of normalized measurement frequencies of quantum states |k> and |k+1> and computing the statistical interval and the estimated value of t based on r and the measured floor and ceiling of t.

20 Claims, 17 Drawing Sheets

(56) References Cited

U.S. PATENT DOCUMENTS

2023/0036827 A1 * 2/2023 Herbert .................. G06N 10/60

OTHER PUBLICATIONS

Svante Janson. Moments of gamma type and the brownian supremum process area. Probab. Surveys, 7:1-52, 2010. DOI: 10.1214/10-PS160. URL https://doi.org/10.1214/10-PS160.

Dmitry Grinko, Julien Gacon, Christa Zoufal, and Stefan Woerner. Iterative quantum amplitude estimation. npj Quantum Information, 7(1), Mar. 2021. DOI: 10.1038/s41534-021-00379-1. URL https://doi.org/10.1038%2Fs41534-021-00379-1.

Vanio Markov, Charlee Stefanski, Abhijit Rao, and Constantin Gonciulea. A generalized quantum inner product and applications to financial engineering, 2022. URL https://arxiv.org/abs/2201.09845.

Frantisek Duris, Juraj Gazdarica, Iveta Gazdaricova, Lucia Striskova, Jaroslav Budis, Jan Turna, and Tomas Szemes. Mean and variance of ratios of proportions from categories of a multinomial distribution. Journal of Statistical Distributions and Applications, 5, 2, Jan. 201. DOI: https://doi.org/10.1186/s40488-018-0083-x.

Charlee Stefanski, Vanio Markov, Constantin Gonciulea "Properties of The Discrete Sinc Quantum State and Applications to Measurement Interpolation" Wells Faro, UC Berkely. Jul. 1, 2022. URL:https://arxiv.org/abs/2207.00564.

* cited by examiner

FIG. 10

FIG. 11A
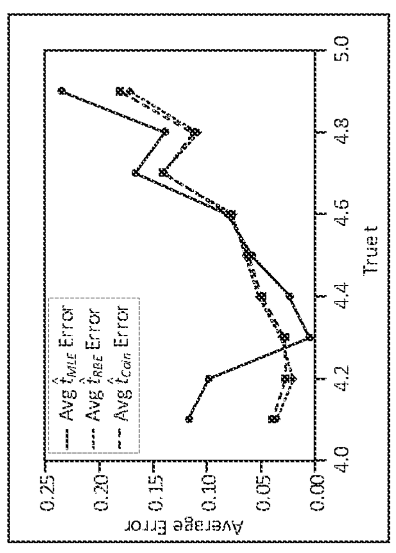
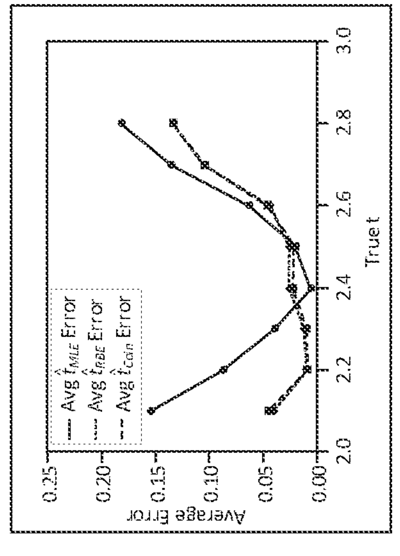
FIG. 11B

SYSTEMS AND METHODS FOR ENCODING AND MEASURING AN ESTIMATED VALUE FROM A DISCRETE SINC QUANTUM STATE

BACKGROUND

Extracting the outcome of a quantum computation is a difficult task. In many cases, the quantum phase estimation algorithm is used to digitally encode a value in a quantum register whose amplitudes' magnitudes reflect the discrete sinc function. In the standard implementation the value is approximated by the most frequent outcome. With this approach, to increase the accuracy of the approximated value, more qubits are required. However, methods which use the frequencies of other outcomes can approximate the value with higher accuracy without using more qubits. One such existing approach is to use Maximum Likelihood Estimation, which uses the frequencies of all measurement outcomes.

BRIEF SUMMARY

In the context of the quantum phase estimation algorithm, using the frequencies of other outcomes allows for increased precision without using additional qubits. We provide and analyze several alternative estimators, the best of which rely on only the two most frequent measurement outcomes. The Ratio-Based Estimator uses a closed form expression for the decimal part of the encoded value using the ratio of the two most frequent outcomes. The Coin Approximation Estimator relies on the fact that the decimal part of the encoded value is very well approximated by the parameter of the Bernoulli process represented by the magnitudes of the largest two amplitudes. We also provide additional properties of the discrete sinc state that could be used to design other estimators.

Quantum phase estimation is a fundamental method in quantum computing, used as a building block in many other quantum algorithms, such as Shor's and quantum amplitude estimation. Its core underlying procedure first creates an analog representation of a periodic signal into quantum state, and then digitally encodes the period of this signal into the state of a quantum register that can be efficiently measured.

We refer to this quantum state with remarkable properties as "discrete sinc", the "period encoding state", the "phase estimation state", or the "interpolation state", because after a phase correction, its amplitudes match the interpolation coefficients in the classical interpolation theorem. We call the resulting outcome probability distribution the "discrete sinc squared" distribution or "the Fejér distribution" because its probabilities match the coefficients in Fejér kernels. We used this state and the underlying procedure in the quantum phase estimation algorithm to encode discrete functions, or dictionaries, into quantum state, and interpolate non-integer values.

While the canonical phase/amplitude estimation algorithms use digital encoding of a value to estimate it, efforts have been made to improve the accuracy of those estimates by interpolating "in-between" the discrete values. In particular, Maximum Likelihood Estimation has been used to post-process measurement results and improve the estimation precision without additional qubits.

Disclosed herein are additional properties of the discrete sinc quantum state and Fejér distribution and alternative estimation methods. We provide closed-form estimators for the expressions for the encoded value that use consecutive pairs of amplitudes as inputs. The pair with the highest magnitudes is the most useful, and we show that it can be used to represent a Bernoulli process, i.e. a (biased) coin, whose parameter (bias) is an estimate for the decimal part of the encoded value. We also show that the equation that needs to be solved in order to find the Maximum Likelihood Estimate is a form of interpolation in the context of the Fejér distribution.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

defined in EQ. 12 and L=1000, compared to $\hat{t}$RBE computed using 1,000 samples from a quantum simulator with n=3, and values of $t \in (6, 7)$.

Figures 9A, 9B:
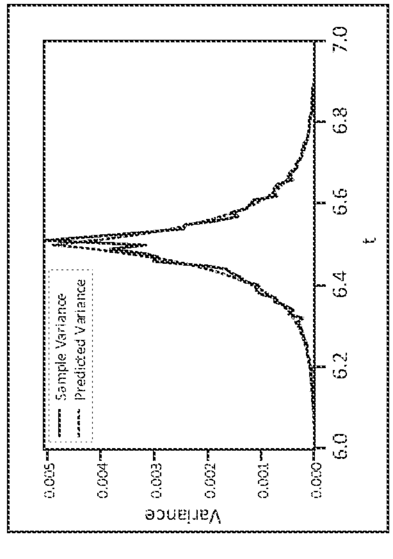
FIG. 9A illustrates the expectation of $\hat{t}_{RBE}$ defined in EQ. 13, with $\mu_{\hat{r}}$ defined in EQ. 11, $$\sigma_{\hat{r}}^2$$

FIG. 9B illustrates the variance of $\hat{t}_{RBE}$ defined in EQ. 14, with $\mu_{\hat{r}}$ defined in EQ. 11, $$\sigma_{\hat{r}}^2$$

defined in EQ. 12 and L=1000, compared to the variance of 100 $\hat{t}_{RBE}$ values computed using 1,000 samples from a quantum simulator.

Figure 10:
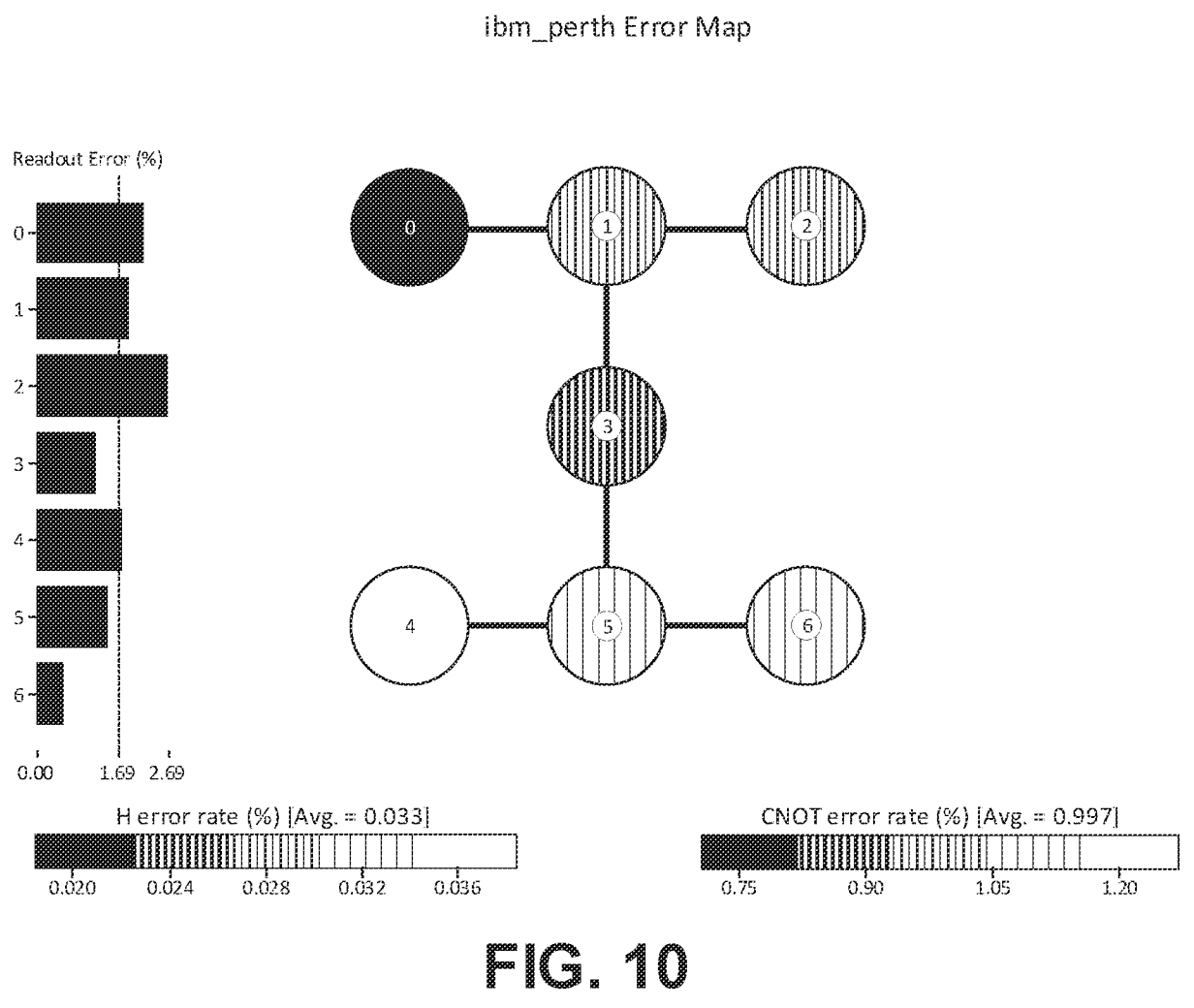

FIG. 10 illustrates an error map of ibm_perth generated at the time of the experiments. The three qubit circuits were run on qubits 1, 3, 5. The four qubit circuits were run on 3, 4, 5, 6. The six quit circuits were run on 0, 1, 3, 4, 5, 6.

FIG. 11A illustrates the average of 20 estimates using each of the three methods (MLE, RBE, and Coin Approximation) from experiments on ibm_perth with n=3 qubits and values of t at increments of 0.1 in between 2.1 and 2.9 and the average error of the respective estimates.

FIG. 11B illustrates the average of 20 estimates using each of the three methods (MLE, RBE, and Coin Approximation) from experiments on ibm_perth with n=3 qubits and values of t at increments of 0.1 in between 4.1 and 4.9, and the average error of the respective estimates.

Figure 12A:
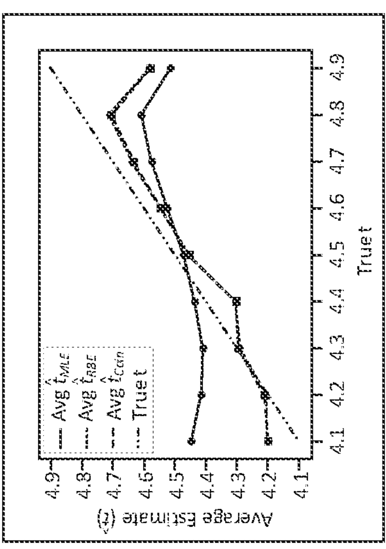
Figure 12A:
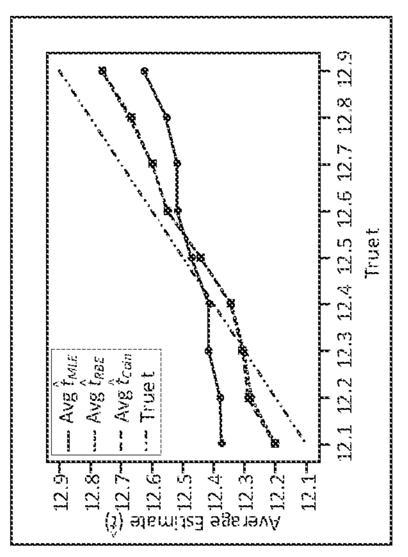

FIG. 12A illustrates the average of 20 estimates using each of the three methods (MLE, RBE, and Coin Approximation) from experiments on ibm_perth with n=4 qubits and values of t at increments of 0.1 in between 4.1 and 4.9, and the average error of the respective estimates.

Figure 12B:
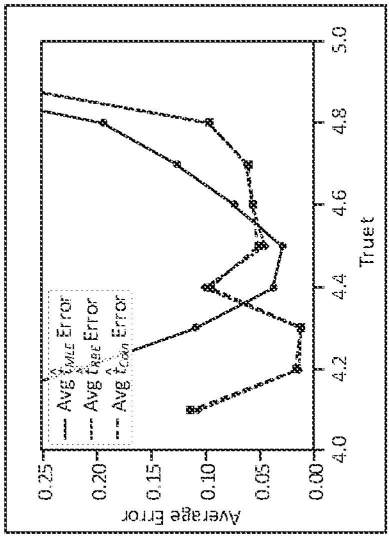
Figure 12B:
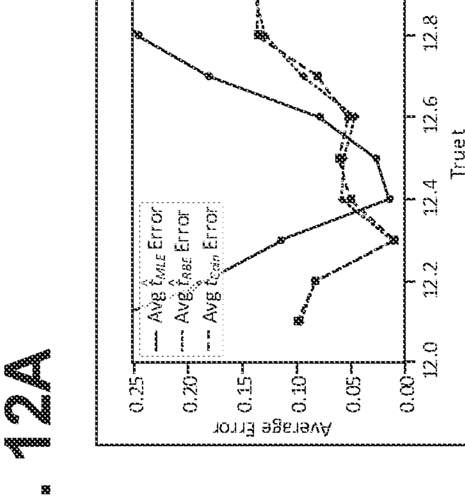

FIG. 12B illustrates the average of 20 estimates using each of the three methods (MLE, RBE, and Coin Approximation) from experiments on ibm_perth with n=4 qubits and values of t at increments of 0.1 in between 12.1 and 12.9, and the average error of the respective estimates.

Figure 13:
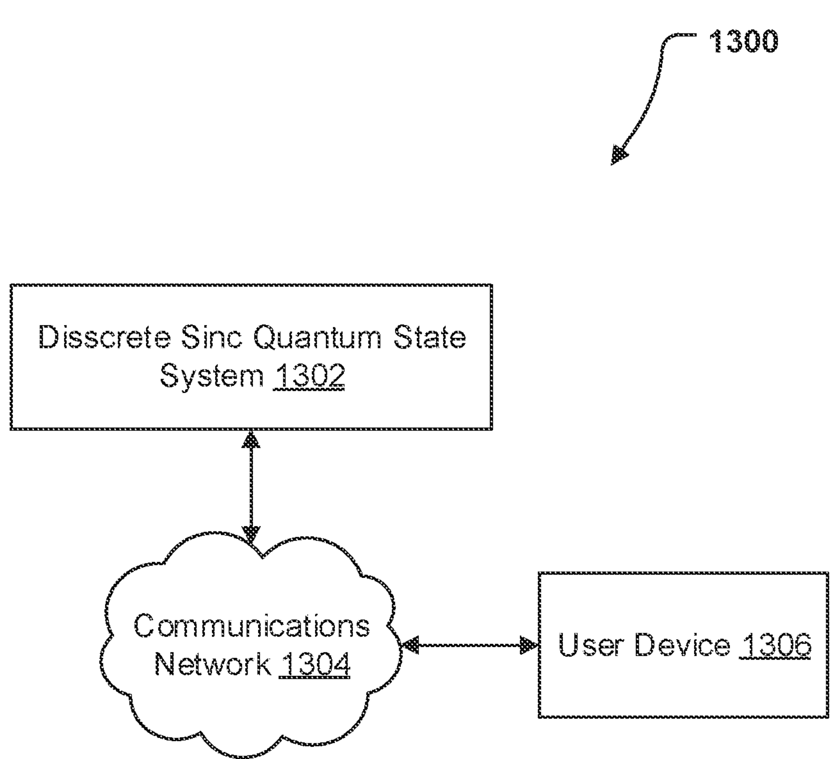

FIG. 13 illustrates a system in which some example embodiments may be used for encoding and measuring the discrete sinc quantum state.

Figure 14:
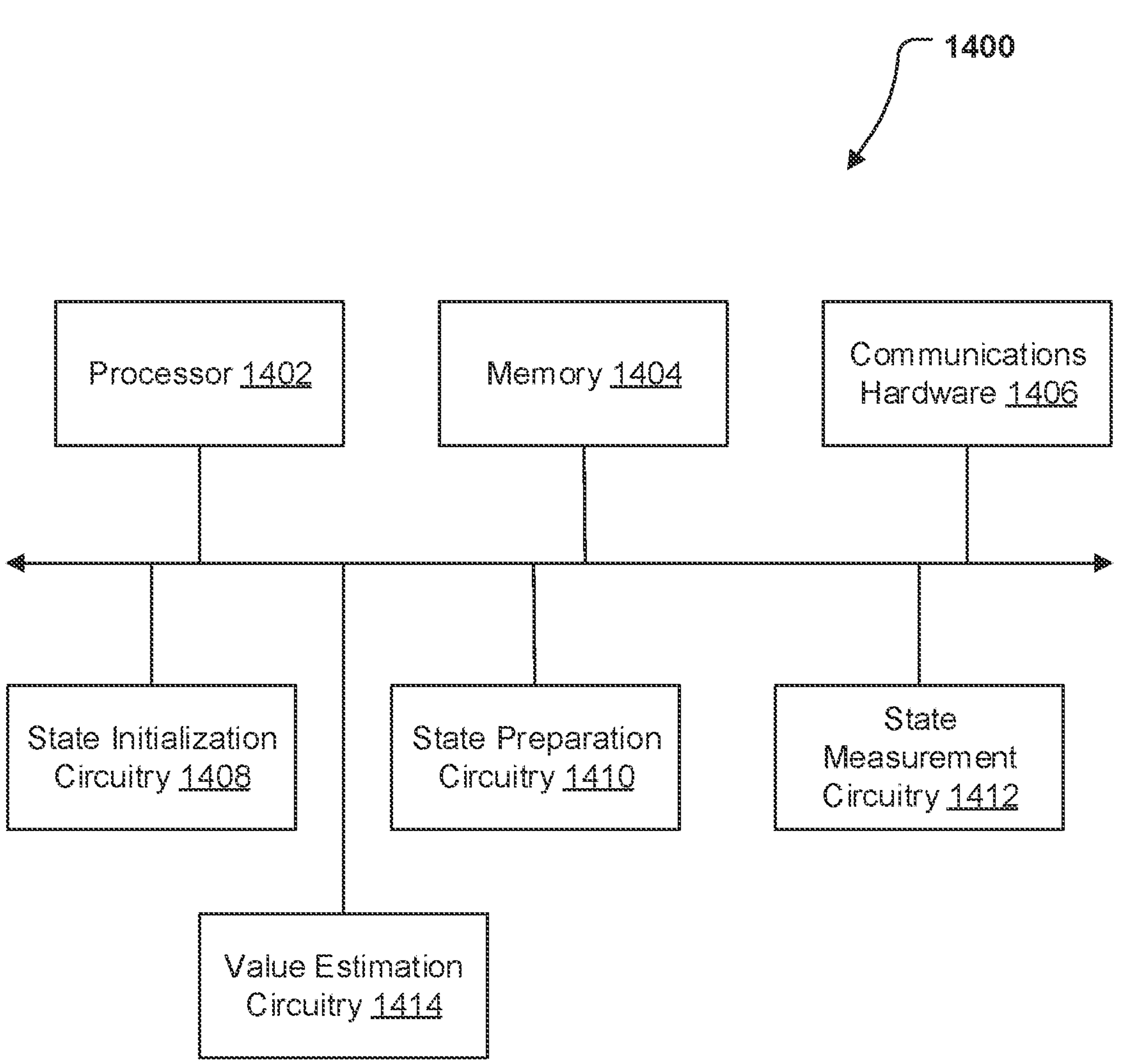

FIG. 14 illustrates a schematic block diagram of example circuitry embodying a system device that may perform various operations in accordance with some example embodiments described herein.

Figure 15:
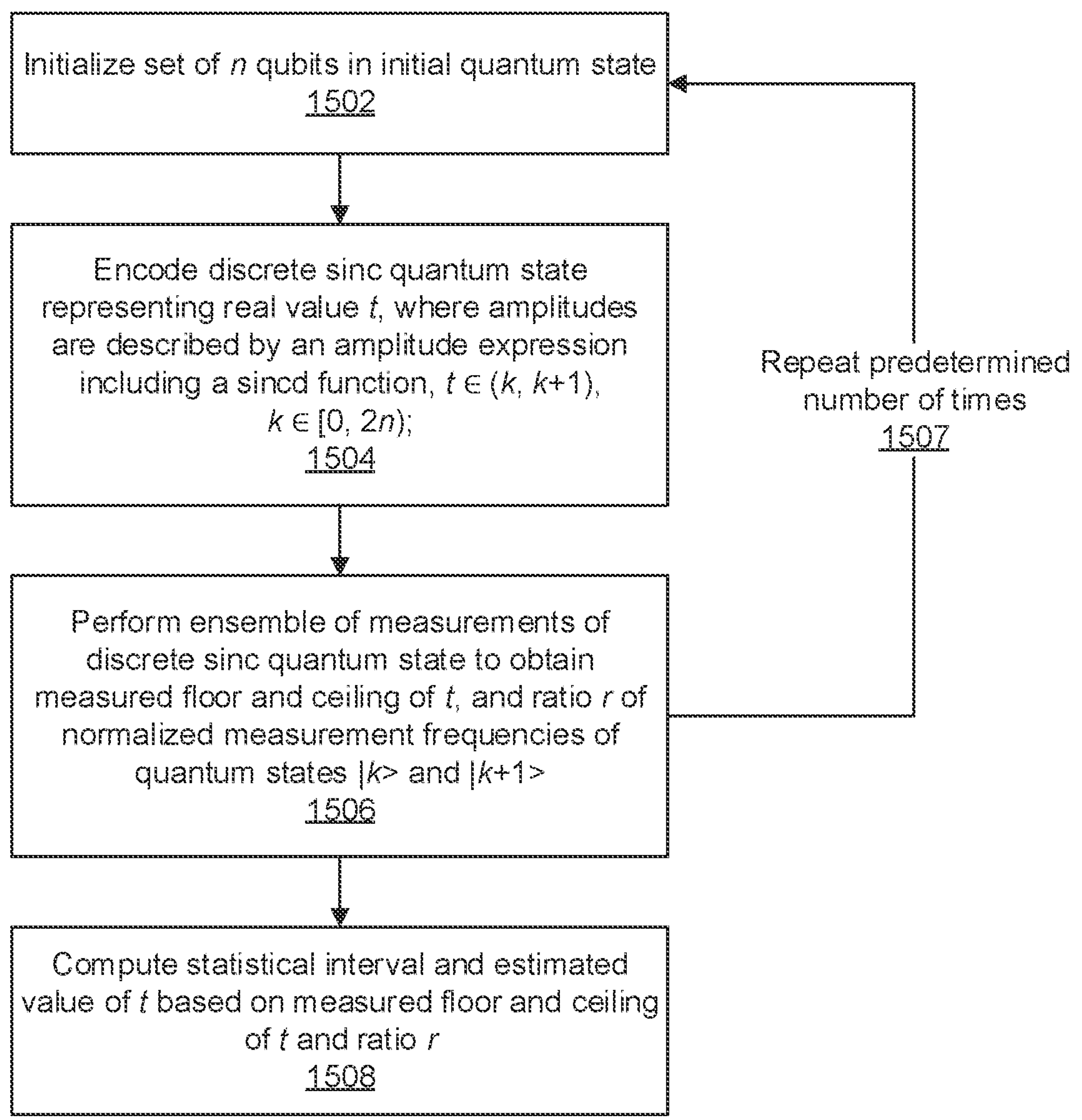

FIG. 15 illustrates an example flowchart for encoding and measuring the discrete sinc quantum state, in accordance with some example embodiments described herein.

Figure 16A:
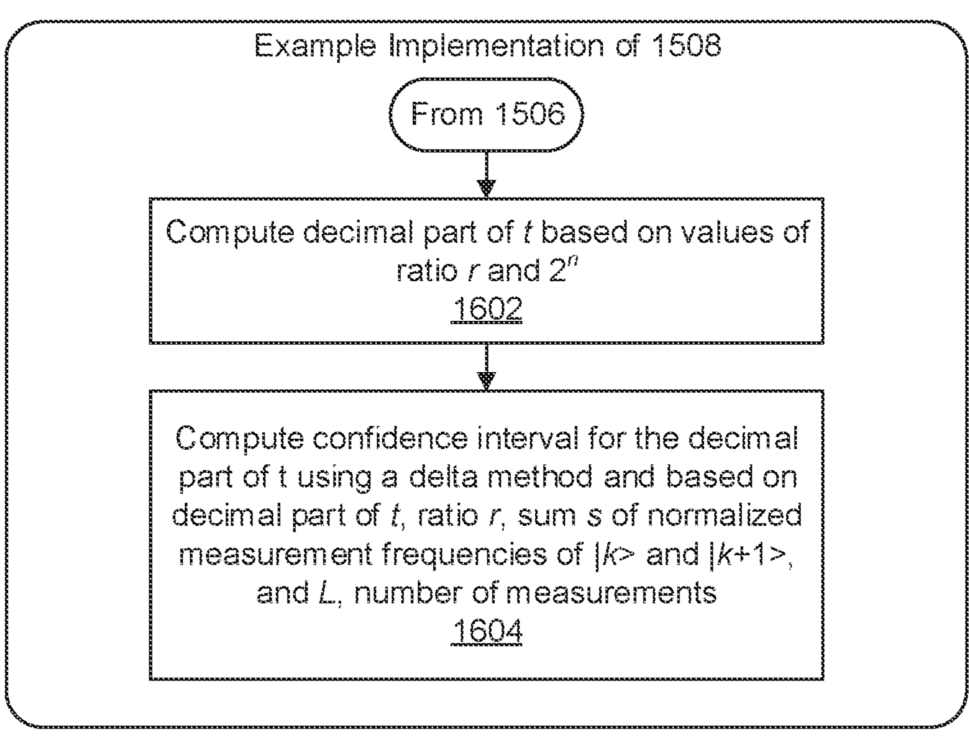

FIG. 16A illustrates an example flowchart for computing a statistical interval from measurements of the discrete sinc quantum state, in accordance with some example embodiments described herein.

Figure 16B:
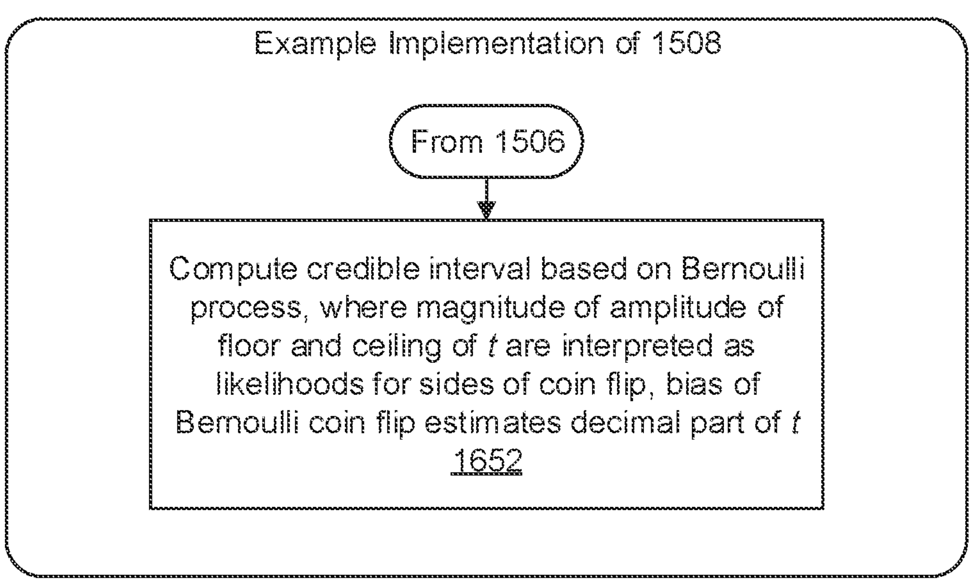

FIG. 16B illustrates an example flowchart for computing a statistical interval from measurements of the discrete sinc quantum state, in accordance with some example embodiments described herein.

Figure 17:
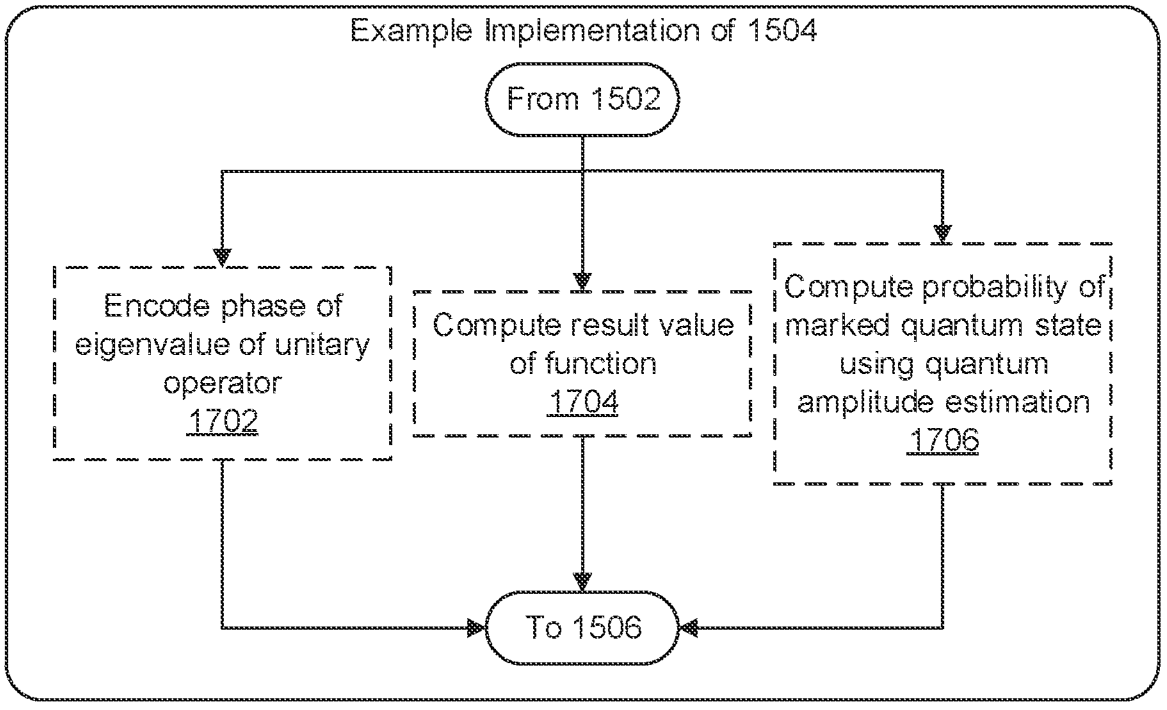

FIG. 17 illustrates another example flowchart for encoding the discrete sinc quantum state, in accordance with some example embodiments described herein.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "statistical interval" refers to a range in which a parameter may fall with a certain probability. The term "statistical interval" is used generally to include the terms confidence interval and credible interval.

The term "quantum computing device", "quantum computer", or "quantum device" is used to refer to a specialized computing device which stores and operates on information in quantum states. A quantum computer may make use of the quantum mechanical principles of superposition and entanglement to perform operations that are impossible on classical computers operating on classical information. Quantum computers include devices relying on technologies such as superconducting circuits, trapped ions, atoms in optical lattices, or any other of a wide array of technologies used to prepare and manipulate quantum states. Quantum computers may be gate-based, or perform operations dictated by a quantum circuit, or series of operators or logic gates that represent different transformations on the stored quantum states. A quantum computer may also be realized as a simulated system on a classical computer, though without the intrinsic speedup that a physical quantum computer provides through the use of superposition and entanglement.

The term "qubit" is used to refer to the fundamental unit of data on a quantum computer. A qubit may be initialized into a known quantum state, and the quantum state of the qubit may be manipulated by the quantum computer. The term qubit may refer to a single system with two orthonormal basis states, typically designated 0 and 1, but the term qubit as used here may also include other schemes of representing quantum data such as a qutrit, qudit, or the like which employ a different set of basis states. A plurality of qubits may also form a set of qubits that when considered together form product basis states that a quantum computer may act on. The term qubit as used here may also include schemes of storing quantum data from non-gate-based quantum computation systems such as adiabatic quantum computers.

The term "quantum circuit" is used to refer to a series of operations on a quantum state of a set of qubits comprising initializations, quantum gates, measurements, and other operations on qubits. A quantum circuit may be realized in varying ways depending on the hardware implementation of the quantum computer on which it is executed. A quantum circuit may also be realized as a simulation of a quantum computer on another device.

System Architecture

Example embodiments described herein may be implemented using any of a variety of computing devices or servers. To this end, FIG. 13 illustrates an example environment 1300 within which various embodiments may operate. As illustrated, a discrete sinc quantum state system 1302 may receive and/or transmit information via communications network 1304 (e.g., the Internet) with any number of other devices, such as a user device 1306.

The discrete sinc quantum state system 1302 may be implemented as one or more computing devices or servers, which may be composed of a series of components. Particular components of the discrete sinc quantum state system 1302 are described in greater detail below with reference to apparatus 1400 in connection with FIG. 14.

The user device 1306 may be embodied by any computing devices known in the art. The user device 1306 need not itself be an independent device, but may comprise peripheral devices communicatively coupled to other computing devices.

Although FIG. 13 illustrates an environment and implementation in which the discrete sinc quantum state system 1302 interacts indirectly with a user via a user device 1306, in some embodiments users may directly interact with the discrete sinc quantum state system 1302 (e.g., via communications hardware of the discrete sinc quantum state system 1302), in which case a separate user device 1306 may not be utilized. Whether by way of direct interaction or indirect interaction via another device, a user may communicate with, operate, control, modify, or otherwise interact with the discrete sinc quantum state system 1302 to perform the various functions and achieve the various benefits described herein.

Example Implementing Apparatuses

The discrete sinc quantum state system 1302 (described previously with reference to FIG. 13) may be embodied by one or more computing devices or servers, shown as apparatus 1400 in FIG. 14. The apparatus 1400 may be configured to execute various operations described above in connection with FIG. 13 and below in connection with FIGS. 15-17. As illustrated in FIG. 14, the apparatus 1400 may include processor 1402, memory 1404, communications hardware 1406, state initialization circuitry 1408, state preparation circuitry 1410, state measurement circuitry 1412, and value estimation circuitry 1414, each of which will be described in greater detail below.

The processor 1402 (and/or co-processor or any other processor assisting or otherwise associated with the processor) may be in communication with the memory 1404 via a bus for passing information amongst components of the apparatus. The processor 1402 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 1400, remote or "cloud" processors, or any combination thereof. The use of the term "processor" may be understood to include a classical processor (e.g., when simulating a quantum computer) or a quantum processor.

The processor 1402 may be configured to execute software instructions stored in the memory 1404 or otherwise accessible to the processor. In some cases, the processor may be configured to execute hard-coded functionality. As such, whether configured by hardware or software methods, or by a combination of hardware with software, the processor 1402 represent an entity (e.g., physically embodied in circuitry) capable of performing operations according to various embodiments of the present invention while configured accordingly. Alternatively, as another example, when the processor 1402 is embodied as an executor of quantum circuits or software instructions, the quantum circuits or software instructions may specifically configure the processor 1402 to perform the algorithms and/or operations described herein when the quantum circuits or software instructions are executed.

Memory 1404 is non-transitory and may include, for example, one or more volatile and/or non-volatile memories. In other words, for example, the memory 1404 may be an electronic storage device (e.g., a computer readable storage medium). The memory 204 may be quantum memory (QRAM or quantum random access memory, capable of storing quantum states), classical memory, or a combination thereof. The memory 1404 may be configured to store information, data, content, applications, software instructions, or the like, for enabling the apparatus to carry out various functions in accordance with example embodiments contemplated herein.

The communications hardware 1406 may be any means such as a device or circuitry embodied in either hardware or a combination of hardware and software that is configured to receive and/or transmit data from/to a network and/or any other device, circuitry, or module in communication with the apparatus 1400. In this regard, the communications hardware 1406 may include, for example, a network interface for enabling communications with a wired or wireless communication network. For example, the communications hardware 1406 may include one or more network interface cards, antennas, buses, switches, routers, modems, and supporting hardware and/or software, or any other device suitable for enabling communications via a network. Furthermore, the communications hardware 1406 may include the processing circuitry for causing transmission of such signals to a network or for handling receipt of signals received from a network.

The communications hardware 1406 may further be configured to provide output to a user and, in some embodiments, to receive an indication of user input. In this regard, the communications hardware 1406 may comprise a user interface, such as a display, and may further comprise the components that govern use of the user interface, such as a web browser, mobile application, dedicated client device, or the like. In some embodiments, the communications hardware 1406 may include a keyboard, a mouse, a touch screen, touch areas, soft keys, a microphone, a speaker, and/or other input/output mechanisms. The communications hardware 1406 may utilize the processor 1402 to control one or more functions of one or more of these user interface elements through software instructions (e.g., application software and/or system software, such as firmware) stored on a memory (e.g., memory 1404) accessible to the processor 1402.

In addition, the apparatus 1400 further comprises a state initialization circuitry 1408 that initializes the set of n qubits in an initial quantum state. The state initialization circuitry 1408 may utilize processor 1402, memory 1404, or any other hardware component included in the apparatus 1400 to perform these operations, as described in connection with FIGS. 15-17 below. The state initialization circuitry 1408 may further utilize communications hardware 1406 to gather data from a variety of sources (e.g., user device 1306, as shown in FIG. 13), and/or exchange data with a user, and in some embodiments may utilize processor 1402 and/or memory 1404 to initialize the quantum state.

In addition, the apparatus 1400 further comprises a state preparation circuitry 1410 that encodes a discrete sing quantum state in the set of n qubits. The state preparation circuitry 1410 may utilize processor 1402, memory 1404, or any other hardware component included in the apparatus 1400 to perform these operations, as described in connection with FIGS. 15-17 below. The state preparation circuitry 1410 may further utilize communications hardware 1406 to gather data from a variety of sources (e.g., user device 1306, as shown in FIG. 13), and/or exchange data with a user, and in some embodiments may utilize processor 1402 and/or memory 1404 to prepare a quantum state.

In addition, the apparatus 1400 further comprises a state measurement circuitry 1412 that performs an ensemble of measurements of the discrete sinc quantum state. The state measurement circuitry 1412 may utilize processor 1402, memory 1404, or any other hardware component included in the apparatus 1400 to perform these operations, as described in connection with FIGS. 15-17 below. The state measurement circuitry 1412 may further utilize communications hardware 1406 to gather data from a variety of sources (e.g., user device 1306, as shown in FIG. 13), and/or exchange data with a user, and in some embodiments may utilize processor 1402 and/or memory 1404 to perform measurements of quantum states.

In addition, the apparatus 1400 further comprises a value estimation circuitry 1414 that computes a statistical interval and estimated value based on an ensemble of measurements. The value estimation circuitry 1414 may utilize processor 1402, memory 1404, or any other hardware component included in the apparatus 1400 to perform these operations, as described in connection with FIGS. 15-17 below. The value estimation circuitry 1414 may further utilize communications hardware 1406 to gather data from a variety of sources (e.g., user device 1306, as shown in FIG. 13), and/or exchange data with a user, and in some embodiments may utilize processor 1402 and/or memory 1404 to compute statistical intervals and estimated values.

Although components 1402-1414 are described in part using functional language, it will be understood that the particular implementations necessarily include the use of particular hardware. It should also be understood that certain of these components 1402-1414 may include similar or common hardware. For example, the state initialization circuitry 1408, state preparation circuitry 1410, state measurement circuitry 1412, and state measurement circuitry 1412 may each at times leverage use of the processor 1402, memory 1404, or communications hardware 1406, such that duplicate hardware is not required to facilitate operation of these physical elements of the apparatus 1400 (although dedicated hardware elements may be used for any of these components in some embodiments, such as those in which enhanced parallelism may be desired). Use of the terms "circuitry" with respect to elements of the apparatus therefore shall be interpreted as necessarily including the particular hardware configured to perform the functions associated with the particular element being described. Of course, while the terms "circuitry" should be understood broadly to include hardware, in some embodiments, the terms "circuitry" may in addition refer to software instructions that configure the hardware components of the apparatus 1400 to perform the various functions described herein.

Although the state initialization circuitry 1408, state preparation circuitry 1410, state measurement circuitry 1412, and value estimation circuitry 1414 may leverage processor 1402, memory 1404, or communications hardware 1406 as described above, it will be understood that any of state initialization circuitry 1408, state preparation circuitry 1410, state measurement circuitry 1412, and value estimation circuitry 1414 may include one or more dedicated processor, specially configured field programmable gate array (FPGA), or application specific interface circuit (ASIC) to perform its corresponding functions, and may accordingly leverage processor 1402 executing software stored in a memory (e.g., memory 1404), or communications hardware 1406 for enabling any functions not performed by special-purpose hardware. In all embodiments, however, it will be understood that state initialization circuitry 1408, state preparation circuitry 1410, state measurement circuitry 1412, and value estimation circuitry 1414 comprise particular machinery designed for performing the functions described herein in connection with such elements of apparatus 1400.

In some embodiments, various components of the apparatus 1400 may be hosted remotely (e.g., by one or more cloud servers) and thus need not physically reside on the corresponding apparatus 1400. For instance, some components of the apparatus 1400 may not be physically proximate to the other components of apparatus 1400. Similarly, some or all of the functionality described herein may be provided by third party circuitry. For example, a given apparatus 1400 may access one or more third party circuitries in place of local circuitries for performing certain functions.

As will be appreciated based on this disclosure, example embodiments contemplated herein may be implemented by an apparatus 1400. Furthermore, some example embodiments may take the form of a computer program product comprising software instructions stored on at least one non-transitory computer-readable storage medium (e.g., memory 1404). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 1400 as described in FIG. 14, that loading the software instructions onto a computing device or apparatus produces a special-purpose machine comprising the means for implementing various functions described herein.

Having described specific components of example apparatuses 1400, theoretical background is explained below, followed by example embodiments are described below in connection with a series of flowcharts.

Preliminaries

Figure 1A:
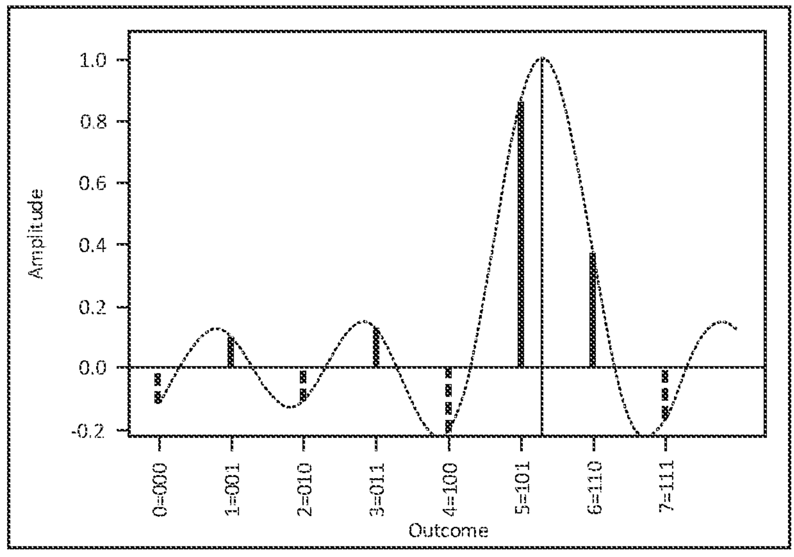
FIG. 1A illustrates a histogram of the amplitudes of a 3-qubit quantum state with the encoded value 5.3 compared to the discrete sinc function.
Figure 1B:
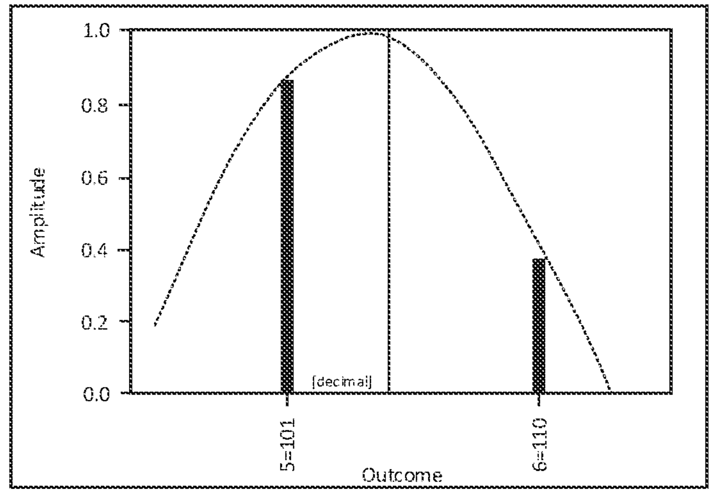
FIG. 1B illustrates the two largest amplitudes of the state, which can be used to estimate the decimal part of the encoded value.

Additional properties of the discrete sinc quantum state and Fejér distribution and alternative estimation methods are disclosed herein. We provide closed-form estimators for the expressions for the encoded value, that use consecutive pairs of amplitudes as inputs. As shown in FIG. 1A and FIG. 1B, the pair with the highest magnitudes is the most useful, and we show that it can be used to represent a Bernoulli process, i.e. a (biased) coin, whose parameter (bias) is an estimate for the decimal part of the encoded value. We also show that the equation that needs to be solved in order to find the Maximum Likelihood Estimate is a form of interpolation in the context of the Fejér distribution.

The sinc function can be defined on a set of real numbers as $$\operatorname{sinc}(t) = \begin{cases} 1, & \text{if } t = 0 \\ \frac{\sin(t)}{t}, & \text{otherwise} \end{cases} = \prod_{j=1}^{\infty} \cos\left(\frac{t}{2^j}\right)$$

For a positive integer and a real number t the function $\operatorname{sincd}_n$ is defined as $$\operatorname{sincd}_n(t) = \frac{\operatorname{sinc}(t)}{\operatorname{sinc}\left(\frac{t}{2^n}\right)} = \prod_{j=1}^{n} \cos\left(\frac{t}{2^j}\right).$$

For a real number t, the normalized versions of the sinc and sincd functions are defined as $\operatorname{sinc}_\pi(t)=\operatorname{sinc}(\pi t)$ and $\operatorname{sincd}_{\pi,n}(t)=\operatorname{sincd}_n(\pi t)$, respectively.

Given a positive integer n and a real number $t \in [0, N)$, where $N=2^n$, consider the quantum state $$|\phi_{n,t}\rangle = \sum_{k=0}^{N-1} e^{i\pi\frac{N-1}{N}(t-k)} c_{N,t}(k)|k\rangle_n \tag{EQ. 1}$$

$$\text{where } c_{N,t}(t) = \begin{cases} 1 & \text{if } t = k \\ \frac{1}{N}\frac{\sin((t-k)\pi)}{\sin((t-k)\pi/N)}, & \text{otherwise} \end{cases} = \operatorname{sincd}_{\pi,n}(t-k) = \prod_{j=1}^{n} \cos\left((t-k)\frac{\pi}{2^j}\right).$$

Note that the amplitudes in the state add up to 1:

$$\sum_{k=0}^{N-1} e^{i\pi\frac{N-1}{N}(t-k)} c_{N,t}(k) = 1. \tag{EQ. 2}$$

This state encodes the result of the phase estimation algorithm, also used in the amplitude estimation algorithm, and to encode values and functions.

If $t \in [0, N)$ is not an integer, the probability mass function of the measurement distribution for the $|\phi_{n,t}\rangle$ quantum state is $$p_{N,t}(k) = \frac{1}{N^2}\frac{\sin^2((t-k)\pi)}{\sin^2\left((t-k)\frac{\pi}{N}\right)} \tag{EQ. 3}$$

for $0 \le k < N$.

The values of $p_{N,t}$ match those of the formalized Fejér kernel.

Lemma 2.1 (MLE property). With the notations above, the following identity holds for a non-integer $t \in [0, N)$:

$$\frac{1}{N}\sum_{k=0}^{N-1} p_{N,t}(k)\cot\left((t-k)\frac{\pi}{N}\right) = \cot(t\pi) \tag{EQ. 4}$$

This property allows for the estimation of the non-integer parameter $t \in [0, N)$ of a given quantum state $|\phi_{n,t}\rangle$ by repeated measurement. The estimation as a real number is more precise than the one obtained by just using the integer outcomes of a measurement, as in the standard phase estimation algorithm.

Equivalent forms of this equation are:

$$\frac{1}{N}\sum_{k=0}^{N-1} (1 - p_{N,t}(k))\cot\left((t-k)\frac{\pi}{N}\right) = 0,$$

and $$\sum_{k=0}^{N-1} p_{N,t}(k)(-1)^k \cos\left((t-k)\frac{\pi}{N}\right) c_{N,t}(k) = \cos(t\pi).$$

Estimating the parameter t of the period encoding state $|\phi_{n,t}\rangle$ and its corresponding probability distribution $p_{N,t}$ from the function q is a statistical inference task. We are looking for the estimate $\hat{t} \in [0, N)$ such that the distribution $p_{N,\hat{t}}$ is the best fit for the function q obtained through measurement.

Kullback-Leibler divergence or maximum likelihood estimation. The relative entropy, or the Kullback-Leibler divergence, from q to $p_{N,t}$ is $$D_{KL}(q \| p_{N,t}) = \sum_{k=0}^{N-1} q(k)\log\left(\frac{q(k)}{p_{N,t}(k)}\right) = \sum_{k=0}^{N-1} q(k)\log(q(k)) - \log \mathcal{L}(t|q)$$

where $$\mathcal{L}(t|q) = \prod_{k=0}^{N-1} p_{N,t}(k)^{q(k)}$$

is the likelihood of the parameter t given the measurement reflected in the function q.

Minimizing the Kullback-Leibler divergence is the same as maximizing the log-likelihood function, which is the essence of the Maximum Likelihood Estimation method:

$$\hat{t}_{MLE} = \underset{t\in[0,N)}{\operatorname{argmax}}\, \mathcal{L}(t|q)$$

Setting the derivative of the log-likelihood function to zero gives the equation for Maximum Likelihood Estimate:

$$0 = \frac{\partial}{\partial t}\log\mathcal{L}(t|q)\left(\hat{t}_{MLE}\right) \tag{EQ. 5}$$

$$0 = \frac{\partial}{\partial t}\sum_{k=0}^{N-1} q(k)\log\left(p_{N,t}(k)\right)\left(\hat{t}_{MLE}\right)$$

$$\cot\left(\hat{t}_{MLE}\pi\right) = \frac{1}{N}\sum_{k=0}^{N-1} q(k)\cot\left(\left(\hat{t}_{MLE}-k\right)\frac{\pi}{N}\right)$$

Note that if $q=p_{N,t}$ (an ideal measurement) then $\hat{t}$ satisfies the equation as reflected in the identity in the preliminaries (EQ. 1).

Figure 2:
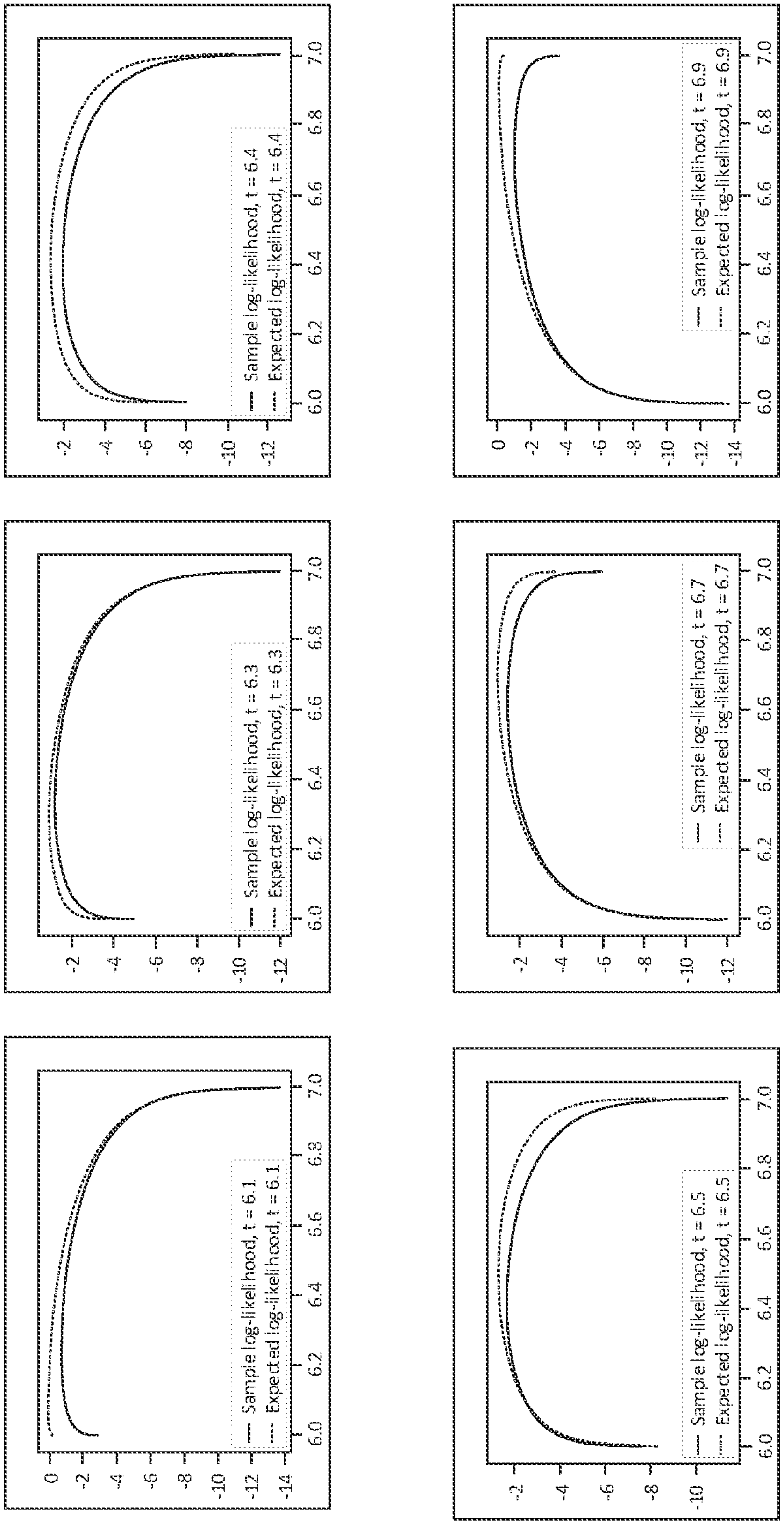
FIG. 2 illustrates the theoretical log-likelihood function compared to the log-likelihood using measurement probabilities from experiments $\log L(t|q)$ for several values t.

This method has the benefit of well-understood theory, including confidence intervals. However, the likelihood function built from measurements on quantum devices in the NISQ era may diverge significantly from the true one. FIG. 2 plots the likelihood function for various t values using experiments run on real quantum devices. These experiments are discussed in detail below.

Discrete Sinc Quantum State and Fejér Distribution Properties

In this section we provide properties of the discrete sinc quantum state that are essential to the design of estimators in the next section.

Lemma 3.1. For a non-integer value $t\in(0, N)$ and an integer $0\le k<N-1$ we have $$c_{N,t}(k) = (-1)^{\lfloor t\rfloor-k} sgn(\lfloor t\rfloor-k)\sqrt{p_{(NL)}(k)}$$

where sgn(x)=−1 if x<0 and sgn(x)=1 if x≥0.

Proof $$c_{N,t}(k) = \frac{\frac{1}{N}\sin((t-k)\pi)}{\sin\left((t-k)\frac{\pi}{N}\right)} = \frac{\frac{1}{N}(-1)^{\lfloor t\rfloor-k}\left|\sin(t\pi)\right|}{\operatorname{sgn}(\lfloor t\rfloor-k)\left|\sin\left((t-k)\frac{\pi}{N}\right)\right|} = (-1)^{\lfloor t\rfloor-k}\operatorname{sgn}(\lfloor t\rfloor-k)\sqrt{p_{N,t}(k)}$$

Lemma 3.2. (Ratio-Based Estimation). Given a non-integer value $1\in(0, N)$ we have $$\tan\left((t-k)\frac{\pi}{N}\right) = \frac{\sin\left(\frac{\pi}{N}\right)}{\cos\frac{\pi}{N}+\sqrt{\frac{p_{N,t}(k)}{p_{N,t}(k+1)}}}, \tag{EQ. 6}$$

for an integer $0\le k<N-1$, and $$\tan\left((t-N+1)\frac{\pi}{N}\right) = \frac{\sin\left(\frac{\pi}{N}\right)}{\cos\frac{\pi}{N}-\sqrt{\frac{p_{N,t}(N-1)}{p_{N,t}(0)}}}. \tag{EQ. 7}$$

Proof. The following proves EQ. 6:

$$\sqrt{\frac{p_{N,t}(k)}{p_{N,t}(k+1)}} = \frac{c_{N,t}(k)}{c_{N,t}(k+1)} = -\frac{\sin(t-k-1)\left(\frac{\pi}{N}\right)}{\sin\left((t-k)\frac{\pi}{N}\right)} = -\frac{\sin\left((t-k)\frac{\pi}{N}\right)\cos\frac{\pi}{N}-\cos\left((t-k)\frac{\pi}{N}\right)\sin\frac{\pi}{N}}{\sin\left((t-k)\frac{\pi}{N}\right)} = -\cos\frac{\pi}{N}+\frac{1}{\tan\left((t-k)\frac{\pi}{N}\right)}\sin\frac{\pi}{N}$$

Therefore, $$\tan\left((t-k)\frac{\pi}{N}\right) = \frac{\sin\frac{\pi}{N}}{\cos\frac{\pi}{N}+\sqrt{\frac{p_{N,t}(k)}{p_{N,t}(k+1)}}}$$

Corollary 3.2.1. For $t\in(k, k+1)$ and an integer $0\le k\le N-1$ we have $$t = k+\frac{N}{\pi}\arctan\left(\frac{\sin\frac{\pi}{N}}{\cos\frac{\pi}{N}+\sqrt{\frac{p_{N,t}(k)}{p_{N,t}(k+1)}}}\right)$$

If $t\in(N-1, N)$ an adjustment needs to be made to the formula:

$$t = N-1+\frac{N}{\pi}\arctan\left(\frac{\sin\frac{\pi}{N}}{\cos\frac{\pi}{N}-\sqrt{\frac{p_{N,t}(N-1)}{p_{N,t}(0)}}}\right).$$

These are also an analytical solution for EQ. 5.

Lemma 3.3 (Coin Approximation). Given a non-integer value t E (k, k+1) and an integer $0\le k<N-1$, if N is sufficiently large the decimal part of t can be approximated by $$t-k \approx \frac{1}{1+\sqrt{\frac{p_{N,t}(k)}{p_{N,t}(k+1)}}} = \frac{\sqrt{p_{N,t}(k+1)}}{\sqrt{p_{N,t}(k)}+\sqrt{p_{N,t}(k+1)}}.$$

Proof. Given the fact that when N is sufficiently large, 1/N is close to 0, we can approximate sin (n/N) by n/N, tan ((t−k)π/N) by (t−k)π/N, and cos (π/N) by 1 in EQ. 6 and EQ. 7.

Corollary 3.3.1. The decimal part of t can be approximated as the bias of a coin that lands heads-up $\lfloor M\sqrt{p_{N,t}(k+1)}\rfloor$ times and tails-up $\lfloor M\sqrt{p_{N,t}(k)}\rfloor$ times, where the integer factor M is chosen based on the desired precision.

Lemma 3.4 (Interpolation Formula). Combining the classical interpolation theorem and Lemma 3.1, for a well-behaved (periodic, band limited, see Charlee Stefanski, Vanio Markov, and Constantin Gonciulea. Quantum amplitude interpolation, 2022) function $f$: {0, . . . , N−1}→R:

$$f(t)=\sum_{k=0}^{N-1} f\left(\frac{k}{N}\right)c_{N,t}(k)=\sum_{k=0}^{N-1} f\left(\frac{k}{N}\right)(-1)^{\lfloor t\rfloor-k}\operatorname{sgn}(\lfloor t\rfloor-k)\sqrt{p_{N,t}(k)}$$

Applications to Quantum Measurement Interpolation

Assume we have an n-qubit quantum register whose state is the result of encoding a value, following the quantum phase estimation procedure. The value could represent the phase of a unitary operator's eigenvalue, as in the original context of quantum phase estimation, the probability of marked states, as in the quantum amplitude estimation context, encoding function values, etc.

With the notation $N=2^n$, we interpret the encoded value as a real number t∈[0, N). In some contexts, we may be interested in the value t/N∈[0, 1). The state of the register will reflect the quantum state in EQ. 1.

Repeated measurements of the state of the register create a sample from the probability distribution $p_{N,t}$ as in EQ. 3. We denote by q the function that maps the outcome k, for 0≤k<N, corresponding to the computational state $|k>_n$ to the proportion (normalized count) of measurements of the outcome k.

Ratio-Based Estimation As discussed in Lemma 3.2, using the formulas in Corollary 3.2.1, the ratio of amplitudes can be used to get an estimate for the value t:

$$\hat{t}_{RBE}=\lfloor t\rfloor+\frac{N}{\pi}\arctan\left(\frac{\sin\left(\frac{\pi}{N}\right)}{\cos\left(\frac{\pi}{N}\right)+\sqrt{\frac{q(\lfloor t\rfloor)}{q(\lceil t\rceil)}}}\right) \quad \text{(EQ. 8)}$$

$$\hat{t}_{RBE}=\lceil t\rceil+\frac{N}{\pi}\arctan\left(\frac{\sin\left(\frac{\pi}{N}\right)}{\cos\left(\frac{\pi}{N}\right)+\sqrt{\frac{q(\lceil t\rceil)}{q(\lfloor t\rfloor)}}}\right) \quad \text{(EQ. 9)}$$

where we can infer the ceiling and floor of t from the measurements (top two largest values of q). We abbreviate this method by "RBE."

Coin Approximation Estimation. As discussed in Lemma 3.3, the magnitudes of the amplitudes of the floor and ceiling of the value t (i.e. the amplitudes with the largest magnitudes) can be used as likelihoods for the sides of a coin whose bias is an estimate for t-[t], the decimal part of t.

We can use one of many available methods to estimate the bias of this Bernoulli process. This approach has the benefit of well-understood theory and known confidence/credible intervals.

In our experiments we have used the Bayesian approach that relies on the fact that the Beta distribution is the conjugate prior of the Bernoulli distribution. The posterior distribution is the Beta distribution with the square roots of the two largest sampling counts as parameters.

Interpolation-Based Estimation. Using the interpolation formula in Lemma 3.4 with a well-behaved function (e.g, π→cos (x π)) we get $$\cos(\hat{t}\pi)\approx\sum_{k=0}^{N-1}\cos\left(\frac{k}{N}\pi\right)(-1)^{\lfloor t\rfloor-k}\operatorname{sgn}(\lfloor t\rfloor-k)\sqrt{q(k)}.$$

Then we can solve for $\hat{t}$.

Confidence Intervals for Ratio-Based and Coin Approximation Estimators

For an integer n>1 and a real number t E (k, k+1), where $N=2^n$ and 0≤k<N, consider the state $|\phi_{n,t}\rangle$ defined in EQ. 1. For a positive integer L, and a sequence of L measurements of this state, denote by r the ratio of the normalized measurement frequencies of the states $|k\rangle$ and $|k+1\rangle$, and by s the sum of these frequencies. Then, according to Eq. 8, the decimal part of t depends only on N and r, and not on k, and is defined by:

$$D_N(r)=\frac{N}{\pi}\arctan\left(\frac{\sin\frac{\pi}{N}}{\cos\frac{\pi}{N}+\sqrt{r}}\right). \quad \text{(EQ. 10)}$$

Since the ratio estimator is asymptotically normally distributed, we can use the delta method (See George Casella and Roger Berger. Statistical Inference. Thomson Learning, 2002). to derive a 800 (1−α) % confidence interval for the estimator of the decimal part of t:

$$\left[D_N(r)-z_{\frac{\alpha}{2}}\frac{\sigma D_N'(r)}{L},\ D_N(r)+z_{\frac{\alpha}{2}}\frac{\sigma D_N'(r)}{L}\right]$$

$$\sigma=(1+r)\sqrt{\frac{r}{s}},z_{\frac{\alpha}{2}}$$

where denotes the normal critical value corresponding to the significance level α∈(0, 1).

Figure 3:
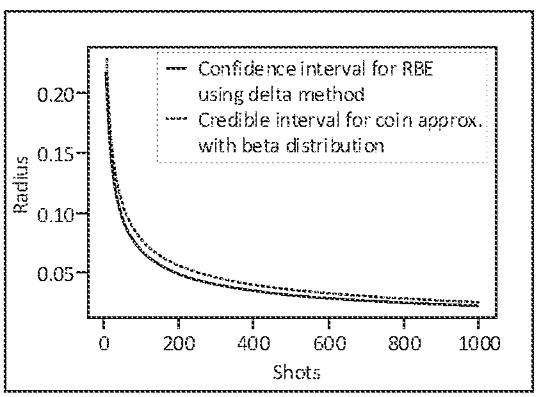
FIG. 3 illustrates the radius of the RBE confidence interval compared to the Coin Approximation credible interval using the theoretical measurement frequencies of the highest two measurements given $n=3$, $N=8$ and $t=4.2$, for a given number of shots.
Figures 4A, 4B, 4C, 4D:
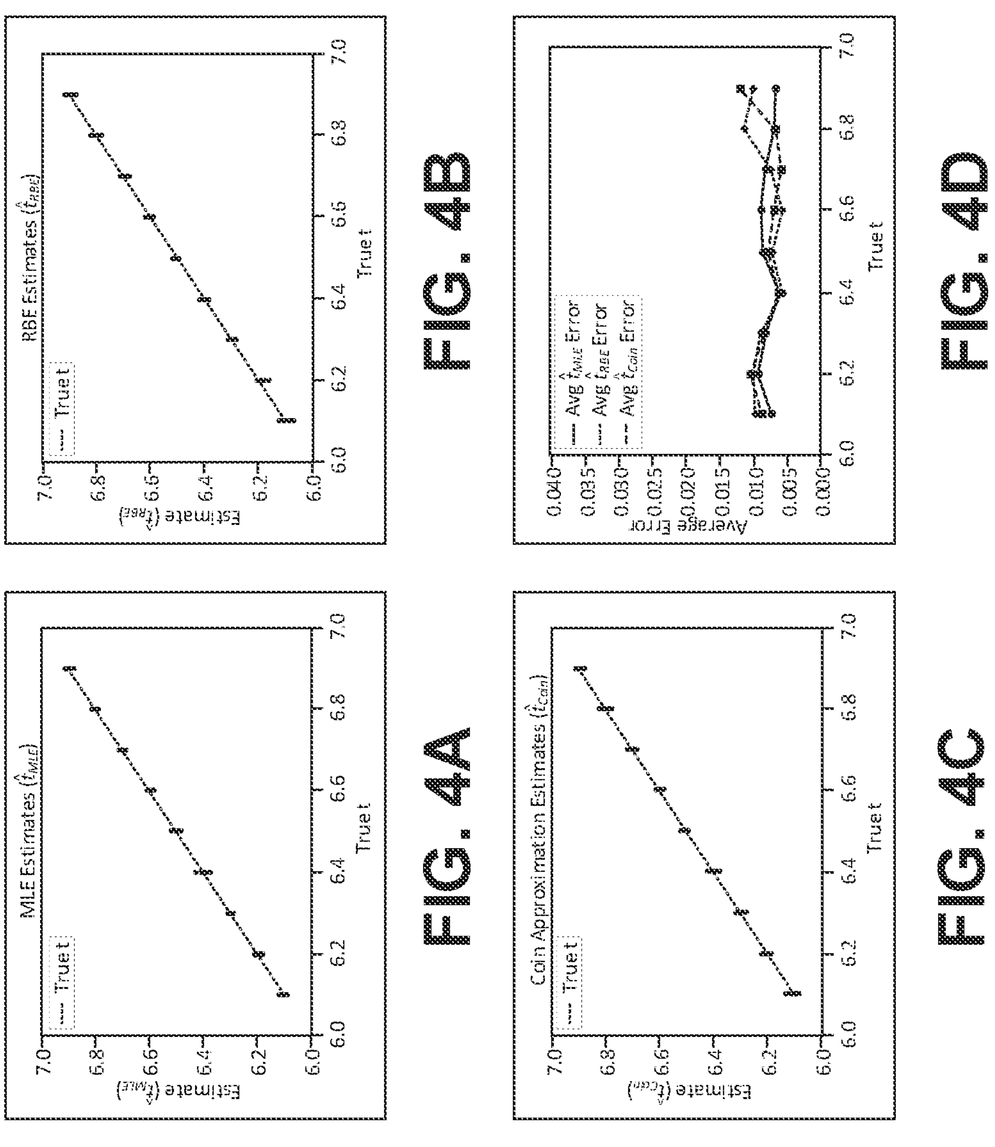
FIG. 4A illustrates MLE estimates for t computed using 1,000 samples from quantum simulator experiments with $n=3$ qubits and values of t at increments of 0.1 in between 6.1 and 6.9.
FIG. 4B illustrates RBE estimates for t computed using 1,000 samples from quantum simulator experiments with $n=3$ qubits and values of t at increments of 0.1 in between 6.1 and 6.9.
FIG. 4C illustrates Coin Approximation estimates for t computed using 1,000 samples from quantum simulator experiments with $n=3$ qubits and values of t at increments of 0.1 in between 6.1 and 6.9.
FIG. 4D illustrates the average error of estimates computed using samples from experiments on a quantum simulator.

Credible intervals for the Coin Approximation Estimator can be computed using the percent point function of the Beta distribution. FIG. 3 compares the radius of the intervals using these two methods.

Numerical Experiments

In the following sections we perform experiments for an empirical analysis of the methods described in the previous section on both quantum simulators and quantum computers.

Using an appropriate value encoding algorithm (See Charlee Stefanski, Vanio Markov, and Constantin Gonciulea. Quantum amplitude interpolation, 2022), the state $|\phi_{n,t}\rangle$ is prepared as defined in EQ. 1 using n-qubits and a given value t∈[0, $2^n$). Each circuit is run with 20,000 shots. The memory parameter allows for the measurement at each shot to be retrieved. We refer to the measurement at a given shot as a sample.

Given a round of samples, we estimate the parameter t using the MLE method discussed in Lemma 2.1 (EQ. 5), as well as the Ratio-Based Estimation (RBE) and Coin Approximation estimation methods introduced previously.

Interpolation-Based Estimation is not included because it did not perform well in experiments.

Quantum Simulator Experiments

The estimations from experiments performed on a quantum simulator backend were both highly accurate and highly precise. FIG. 4A, FIG. 4B, FIG. 4C, and FIG. 4D visualize 20 estimations for values of t at increments of 0.1 in between 6.1 and 6.9 using three different estimation methods: RBE, Coin Approximation and MLE. The average error of the 20 estimates is low for all three methods, and it is difficult to determine if any method gives better estimates.

Quantum Hardware Experiments

Figure 5:
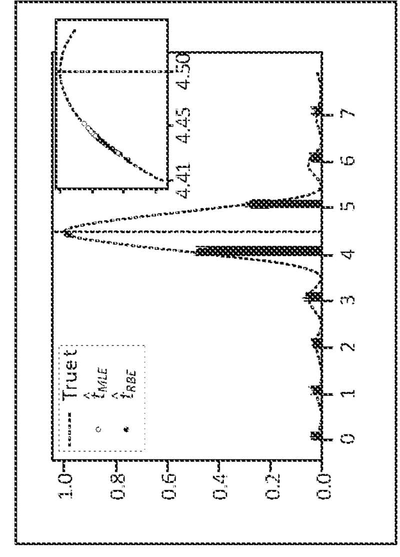
FIG. 5 illustrates the histograms of normalized measurement probabilities for each set of 1,000 samples from experiments with $n=3$ qubits and $t=4.1$, $t=4.5$ and $t=4.9$, compared to the expected probability distribution defined in EQ. 3. For each set of 1,000 samples, we compute estimates using MLE and RBE.
Figure 5:
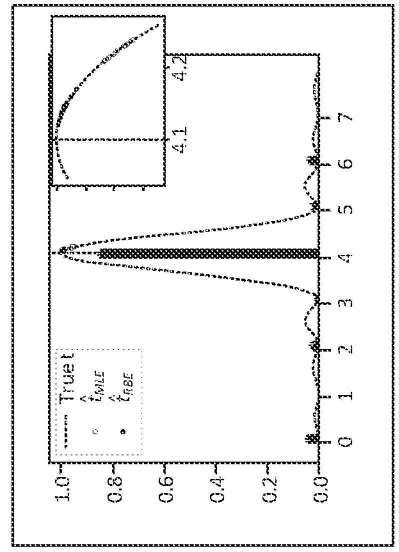
Figure 5:
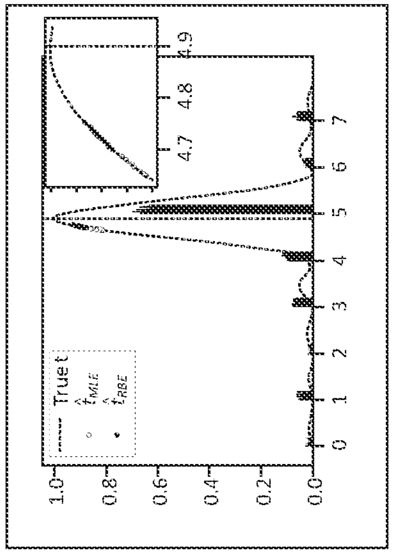
Figure 6:
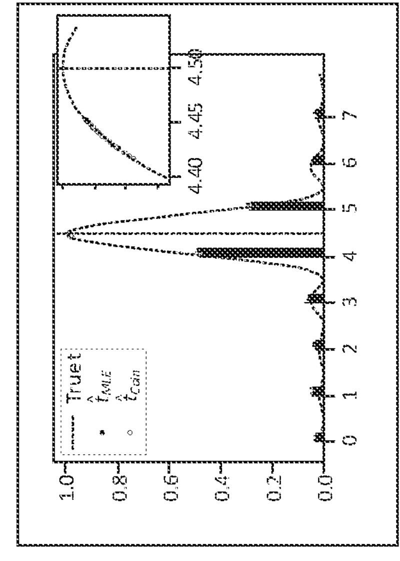
FIG. 6 illustrates the histograms of normalized measurement probabilities for each set of 1,000 samples from experiments with $n=3$ qubits and $t=4.1$, $t=4.5$ and $t=4.9$, compared to the expected probability distribution defined in EQ. 3. For each set of 1,000 samples, we compute estimates using MLE and Coin Approximation Estimation.
Figure 6:
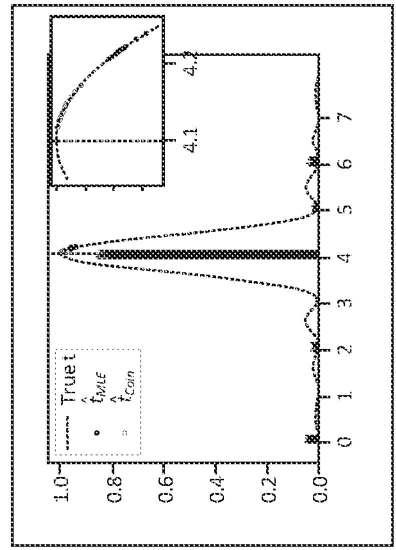
Figure 6:
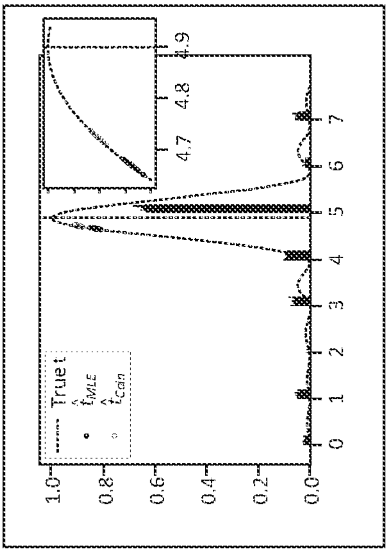
Figures 7A, 7B, 7C, 7D:
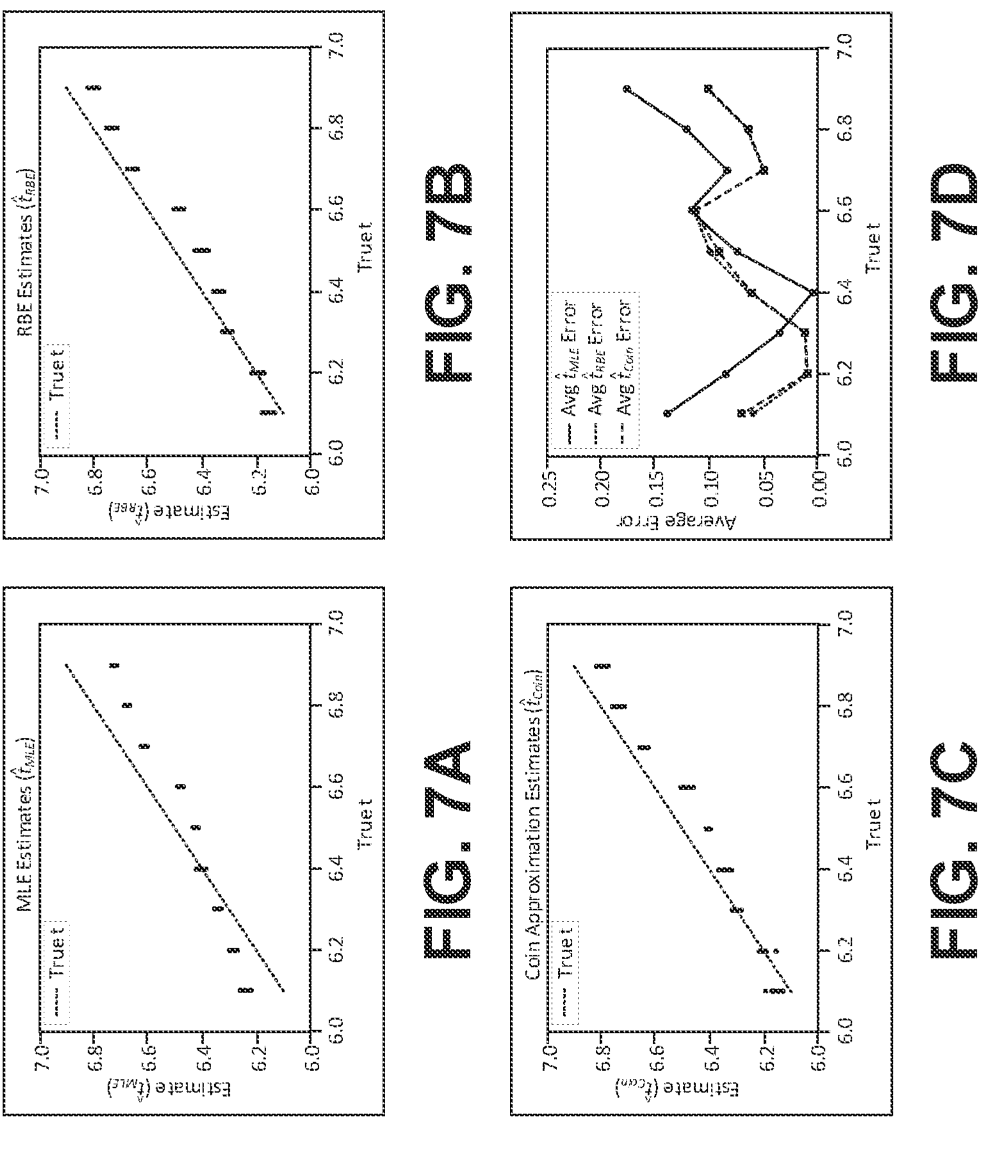
FIG. 7A illustrates MLE estimates for t computed using 1,000 samples from experiments with n=3 qubits and values of t at increments of 0.1 in between 6.1 and 6.9.
FIG. 7B illustrates RBE estimates for t computed using 1,000 samples from experiments with n=3 qubits and values of t at increments of 0.1 in between 6.1 and 6.9.
FIG. 7C illustrates Coin Approximation estimates for t computed using 1,000 samples from experiments with n=3 qubits and values of t at increments of 0.1 in between 6.1 and 6.9.
FIG. 7D illustrates the average error of estimates computed using samples from experiments on a quantum simulator.

FIGS. 5-6 visualize the measurement frequencies from experiments using 3 qubits and estimates for various values of t. Each estimate is computed using a set of 1,000 samples, and we repeat the process for 20 rounds. FIG. 5 compares estimates computed using MLE and RBE methods and FIG. 6 compares estimates computed using MLE and Coin Approximation Estimation.

As mentioned previously, results from experiments on real quantum hardware in the NISQ era show much more divergence from the true likelihood function than results from quantum simulation. FIG. 7A, FIG. 7B, FIG. 7C, and FIG. 7D visualize results from 20 rounds with 1,000 samples each for values of t at increments of 0.1 in between 6.1 and 6.9 using 3 qubits.

Additional Properties of the Discrete Sinc Quantum State

The following additional identities can be useful in further understanding the discrete sinc quantum state and associated Fejér distribution.

Lemma A.1. Given a non-integer t E (0, N) and an integer 0≤N we have $$\tan\left((t-k)\frac{\pi}{N}\right)=\sqrt{\frac{p_{N,t}\left(\left(k+\frac{N}{2}\right)\bmod N\right)}{p_{N,t}(k)}}$$

$$\sum_{k=0}^{N-1}\sin\left((t-k)\frac{\pi}{N}\right)c_{N,t}(k)=0$$

$$\sum_{k=0}^{N-1}\cos\left((t-k)\frac{\pi}{N}\right)c_{N,t}(k)=1$$

$$\sum_{k=0}^{N-1}(-1)^k\sin\left((t-k)\frac{\pi}{N}\right)c_{N,t}(k)=\sin(t\pi)$$

$$\sum_{k=0}^{N-1}e^{i\pi\frac{N-1}{N}k}c_{N,t}(k)=e^{i\pi\frac{N-1}{N}t}$$

$$\sum_{k=0}^{N-1}(-1)^k\cos\left(k\frac{\pi}{N}\right)c_{N,t}(k)=\cos\left(\frac{t(N-1)}{N}\pi\right)$$

$$\sum_{k=0}^{N-1}(-1)^k\sin\left(k\frac{\pi}{N}\right)c_{N,t}(k)=-\sin\left(\frac{t(N-1)}{N}\pi\right)$$

$$\sum_{k=0}^{N-1}\cot\left((t-k)\frac{\pi}{N}\right)=\cot(t\pi)$$

Estimator Analysis

For a positive integer L, and a sequence of L measurements of the state |ϕn,t> defined in EQ. 1 (where n is a positive integer, N=2" and t∈[0, N)), we denote by r the ratio of the probabilities of the states |k⟩ and |k+1⟩. We denote by r̂ the estimator of this ratio. We analyse (See Frantisek Duris, Juraj Gazdarica, Iveta Gazdaricova, Lucia Striskova, Jaroslav Budis, Jan Turna, and Tomas Szemes. Mean and variance of ratios of proportions from categories of a multinomial distribution. Journal of Statistical Distributions and Applications, 5, 2, January 201. DOI: https://doi.org/10.1186/s40488-018-0083-x) the expectation and variance of r̂.

The expectation of r̂ is $$\mu_{\hat{r}}=\frac{p_{N,t}(k)}{p_{N,t}(k+1)}\left(1+\frac{1}{L_{p_{N,t}}(k+1)}\right), \quad \text{(EQ. 11)}$$

and its variance is $$\sigma_{\hat{r}}^2=\frac{1}{L}\left(\frac{p_{N,t}(k)}{p_{N,t}(k+1)}\right)^2\left(\frac{1}{p_{N,t}(k)}+\frac{1}{p_{N,t}(k+1)}\right) \quad \text{(EQ. 12)}$$

where $p_{N,t}$ is defined in EQ. 3 and 0≤k≤N.

Figure 8A:
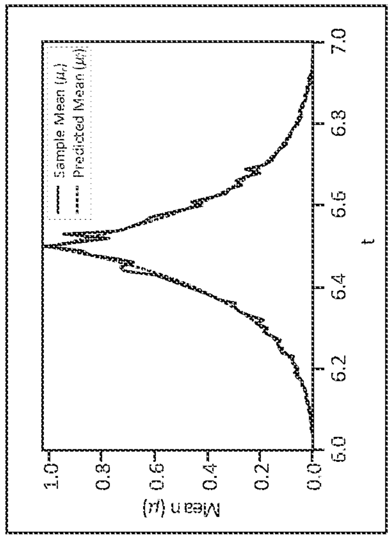
FIG. 8A illustrates the expectation of $\hat{r}$ defined in EQ. 11 compared to measured values of r from a quantum simulator for L=1,000 samples, n=3 qubits and values of $t \in (6, 7)$.
Figure 8B:
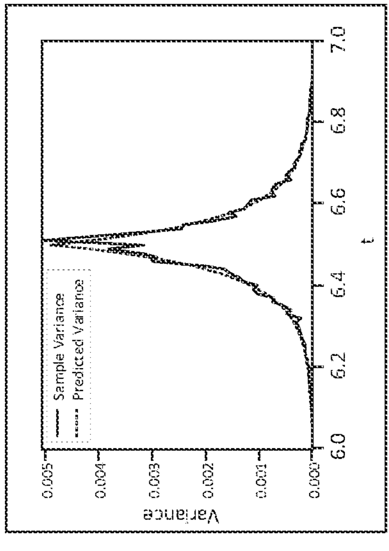
FIG. 8B illustrates the predicted variance of $\hat{r}$ defined in EQ. 12 compared to the variance of measured values of r from 100 rounds using a quantum simulator for L=1,000 samples, n=3 qubits and values of $t \in (6, 7)$. In both figures, we use the opposite ratio for values of t with a decimal part greater than 0.5 to keep the ratio less than 1.

FIG. 8A and FIG. 8B show samples of the expectation and variance compared to the theoretical values.

Using the Taylor expansion of the function DN defined in EQ. 10, we can compute the expectation and variance of the estimator.

The expectation is $$E\left(\hat{t}_{RBE}\right)\approx D_N'(\mu_{\hat{r}})+\frac{D_N''(\mu_{\hat{r}})}{2}\sigma_{\hat{\gamma}}^2, \quad \text{(EQ. 13)}$$

and the variance is $$\mathrm{Var}\left(\hat{t}_{RBE}\right)\approx D_N'(\mu_{\hat{r}})^2\sigma_{\hat{r}}^2-\frac{1}{4}D_N''(\mu_{\hat{r}})^2\sigma_{\hat{r}}^2 \quad \text{(EQ. 14)}$$

where $\hat{t}_{RBE}$ is defined in EQ. 8. FIG. 9A and FIG. 9B show the expectation of $\hat{t}$ compared to measured values of r from a quantum simulator.

Hardware Details for Experiments

These experiments were run on the IBM Quantum system ibm_perth, which is an IBM Quantum Falcon processor with 7 qubits. The error map at the time of the experiments is shown in FIG. 10. Each circuit in the experiment was measured with 20,000 shots. Relevant calibration data is included in FIG. 10 and Table 1.

TABLE 1

Calibration data from ibm_perth from calibration before experiments.

| Qubit Pair | Error (%) | Qubit | $T_1$ (μs) | $T_1$ (μs) |
|---|---|---|---|---|
| (0, 1) | 0.918 | Q0 | 147 | 85 |
| (1, 3) | 0.890 | Q1 | 218 | 57 |
| (3, 5) | 0.990 | Q2 | 130 | 127 |
| (4, 5) | 1.203 | Q3 | 155 | 165 |
| (5, 6) | 1.271 | Q4 | 199 | 155 |
| Average | 1.05 ± 0.17 | | | |

Additional Quantum Hardware Experiments

FIG. 11A, FIG. 11B, FIG. 12A, and FIG. 12B visualize the results of experiments run on ibm_perth with 3 and 4 qubits, respectively, for more intervals of t.

Example Operations

Turning to FIGS. 15-17, example flowcharts are illustrated that contain example operations implemented by example embodiments described herein. The operations illustrated in FIGS. 15-17 may, for example, be performed by the discrete sinc quantum state system 1302 shown in FIG. 13, which may in turn be embodied by an apparatus 1400, which is shown and described in connection with FIG. 14. To perform the operations described below, the apparatus 1400 may utilize one or more of processor 1402, memory 1404, communications hardware 1406, state initialization circuitry 1408, state preparation circuitry 1410, state measurement circuitry 1412, value estimation circuitry 1414, and/or any combination thereof. It will be understood that user interaction with the discrete sinc quantum state system 1302 may occur directly via communications hardware 1406, or may instead be facilitated by a separate user device 1306, as shown in FIG. 13, and which may have similar or equivalent physical componentry facilitating such user interaction.

Turning first to FIG. 15, example operations are shown for encoding and measuring the discrete sinc quantum state. As shown by operation 1502, the apparatus 1400 includes means, such as processor 1402, memory 1404, communications hardware 1406, state initialization circuitry 1408, or the like, for initializing a set of n qubits in an initial quantum state. The apparatus 1400 may perform the actions associated with operation 1502 in accordance with the descriptions above, including the descriptions of FIGS. 1A-12B and EQS. 1-14.

As shown by operation 1504, the apparatus 1400 includes means, such as processor 1402, memory 1404, communications hardware 1406, state preparation circuitry 1410, or the like, for encoding a discrete sinc quantum state representing the real value t, where amplitudes are described by an amplitude expression including a $\mathrm{sincd}_{\pi,n}$ function, where t is bounded by (k, k+1), and k is bounded by [0, $2^n$). The apparatus 1400 may perform the actions associated with operation 1504 in accordance with the descriptions above, including the descriptions of FIGS. 1A-12B and EQS. 1-14.

As shown by operation 1506, the apparatus 1400 includes means, such as processor 1402, memory 1404, communications hardware 1406, state measurement circuitry 1412, or the like, for performing an ensemble of measurements of the discrete sinc quantum state to obtain a measured floor of t, a measured ceiling of t, and a ratio r of normalized measurement frequencies of quantum states |k> and |k+1>. The apparatus 1400 may perform the actions associated with operation 1506 in accordance with the descriptions above, including the descriptions of FIGS. 1A-12B and EQS. 1-14.

As shown by arrow 1507, operation 1502, operation 1504, and operation 1506 may be repeated a predetermined number of times to produce an ensemble of measurements. Although some example embodiments disclosed herein are described in terms of a single measurement, it will be understood by one skilled in the art that example operations disclosed herein may be repeated any number of times to collect a large sample of measurements. The number of repetitions may be determined in order to collect a large enough number of measurements for accurate determination of statistical values described below, and/or may be selected to be small enough to minimize the processing time needed to perform the example methods.

As shown by operation 1508, the apparatus 1400 includes means, such as processor 1402, memory 1404, communications hardware 1406, value estimation circuitry 1414, or the like, for computing the statistical interval and the estimated value of t based on the measured floor of t, the measured ceiling of t, and the ratio r. The apparatus 1400 may perform the actions associated with operation 1508 in accordance with the descriptions above, including the descriptions of FIGS. 1A-12B and EQS. 1-14.

In some embodiments, operation 1508 may be performed in accordance with the operations described by FIG. 11A. Turning now to FIG. 11A, example operations are shown for computing the statistical interval and estimated value of t.

As shown by operation 1602, the apparatus 1400 includes means, such as processor 1402, memory 1404, communications hardware 1406, value estimation circuitry 1414, or the like, for computing a decimal part of t based on values of the ratio r and $2^n$. The apparatus 1400 may perform the actions associated with operation 1602 in accordance with the descriptions above, including the descriptions of FIGS. 1A-12B and EQS. 1-14.

As shown by operation 1604, the apparatus 1400 includes means, such as processor 1402, memory 1404, communications hardware 1406, value estimation circuitry 1414, or the like, for computing a confidence interval for the decimal part of t using a delta method and based on the decimal part of t, the ratio r, and s, a sum of normalized measurement frequencies of the quantum states |k> and |k+1>, and L, a number of measurements in the ensemble of measurement. The apparatus 1400 may perform the actions associated with operation 1602 in accordance with the descriptions above, including the descriptions of FIGS. 1A-12B and EQS. 1-14.

In some embodiments, operation 1508 may be performed in accordance with the operations described by FIG. 16B. Turning now to FIG. 16B, example operations are shown for computing the statistical interval and estimated value of t.

As shown by operation 1652, the apparatus 1400 includes means, such as processor 1402, memory 1404, communications hardware 1406, value estimation circuitry 1414, or the like, for computing a credible interval based on a Bernoulli process, wherein the magnitude of the amplitude of (i) the measured floor of t and (ii) the measured ceiling of t are interpreted as likelihoods for sides of a Bernoulli coin flip, where bias of the Bernoulli coin flip is an estimate for a decimal part of t. The apparatus 1400 may perform the actions associated with operation 1652 in accordance with the descriptions above, including the descriptions of FIGS. 1A-12B and EQS. 1-14.

In some embodiments, operation 1504 may be performed in accordance with the operations described by FIG. 12. Turning now to FIG. 12, example operations are shown for encoding a discrete sinc quantum state representing the real value t.

As shown by operation 1702, the apparatus 1400 may include means, such as processor 1402, memory 1404, communications hardware 1406, state preparation circuitry 1410, or the like, for encoding a phase of an eigenvalue of a unitary operator. The apparatus 1400 may perform the actions associated with operation 1652 in accordance with the descriptions above, including the descriptions of FIGS. 1A-12B and EQS. 1-14.

As shown by operation 1704, the apparatus 1400 may include means, such as processor 1402, memory 1404, communications hardware 1406, state preparation circuitry 1410, or the like, for computing a result value of a function. The apparatus 1400 may perform the actions associated with operation 1652 in accordance with the descriptions above, including the descriptions of FIGS. 1A-12B and EQS. 1-14.

As shown by operation 1706, the apparatus 1400 may include means, such as processor 1402, memory 1404, communications hardware 1406, state preparation circuitry 1410, or the like, for computing a probability of a marked quantum state using quantum amplitude estimation. The apparatus 1400 may perform the actions associated with operation 1652 in accordance with the descriptions above, including the descriptions of FIGS. 1A-12B and EQS. 1-14.

FIGS. 15-17 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

CONCLUSION

Example methods are disclosed herein for estimating the decimal part of a number encoded through the Phase or Amplitude Estimation Algorithm.

The full interpolation method and the Maximum Likelihood Estimation method use sampling counts for all possible outcomes, and give good theoretical results, but it turns out that they are sensitive to noise when implemented on quantum hardware that is currently available, without additional error correction. Methods that rely on only the top two counts seem to be less sensitive to such noise, and they are also simple to use, providing closed forms for the decimal of the encoded value for the given counts. Confidence/credible intervals for these methods are also relatively simple to obtain.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for encoding and measuring an estimated value from a discrete sinc quantum state, the method comprising:

initializing, by state initialization circuitry, a set of n qubits by preparing the set of n qubits in an initial quantum state;

encoding, by state preparation circuitry, the discrete sinc quantum state representing a real value t, wherein amplitudes of the discrete sinc quantum state are described by an amplitude expression comprising a $\text{sinc}_{\lambda,n}$ function, wherein t is bounded by (k, k+1), wherein k is bounded by $[0, 2^n)$;

performing, by state measurement circuitry, an ensemble of measurements of the discrete sinc quantum state to obtain a measured floor of t, a measured ceiling of t, and a ratio r of normalized measurement frequencies of quantum states |k> and |k+1>; and computing, by value estimation circuitry, a statistical interval and the estimated value of t based on the measured floor of t, the measured ceiling of t, and the ratio r, wherein computing the statistical interval and the estimated value of the real value t comprises:

computing, by the value estimation circuitry, a decimal part of t based on values of the ratio r and $2^n$, and computing, by the value estimation circuitry, a confidence interval for the decimal part of t using a delta method and based on the decimal part of t, the ratio r, and s, a sum of the normalized measurement frequencies of the quantum states |k> and |k+1>, and L, a number of measurements in the ensemble of measurements.

2. The method of claim 1, wherein computing the statistical interval and the estimated value of the real value t comprises:

computing, by the value estimation circuitry, a credible interval based on a Bernoulli process, wherein the magnitude of the amplitude of (i) the measured floor of t and (ii) the measured ceiling of t are interpreted as likelihoods for sides of a Bernoulli coin flip, wherein bias of the Bernoulli coin flip is an estimate for a decimal part of t.

3. The method of claim 1, wherein encoding the discrete sinc quantum state representing the real value t comprises encoding, by the state preparation circuitry, a phase of an eigenvalue of a unitary operator.

4. The method of claim 1, wherein encoding the discrete sinc quantum state representing the real value t comprises computing, by the state preparation circuitry, a result value of a function.

5. The method of claim 1, wherein encoding the discrete sinc quantum state representing the real value t comprises computing, by the state preparation circuitry, a probability of a marked quantum state using quantum amplitude estimation.

6. The method of claim 1, wherein a quantum computer comprises the state initialization circuitry, the state preparation circuitry, and the state measurement circuitry, wherein a classical computer comprises the value estimation circuitry.

7. The method of claim 1, wherein a quantum computer comprises the state initialization circuitry, the state preparation circuitry, the state measurement circuitry, the value estimation circuitry.

8. An apparatus for encoding and measuring an estimated value from a discrete sinc quantum state, the apparatus comprising:

state initialization circuitry configured to initialize a set of n qubits by preparing the set of n qubits in an initial quantum state;

state preparation circuitry configured to encode the discrete sinc quantum state representing a real value t, wherein amplitudes of the discrete sinc quantum state are described by an amplitude expression comprising a $\mathrm{sincd}_{\pi,n}$ function, wherein tis bounded by (k, k+1), wherein k is bounded by $[0, 2^n)$;

state measurement circuitry configured to perform an ensemble of measurements of the discrete sinc quantum state to obtain a measured floor of t, a measured ceiling of t, and a ratio r of normalized measurement frequencies of quantum states |k> and |k+1>; and value estimation circuitry configured to compute the compute a statistical interval and the estimated value of t based on the measured floor of t, the measured ceiling of t, and the ratio r, wherein computing the statistical interval and the estimated value of the real value t comprises:

computing, by the value estimation circuitry, a decimal part of t based on values of the ratio r and $2^n$, and computing, by the value estimation circuitry, a confidence interval for the decimal part of t using a delta method and based on the decimal part of t, the ratio r, and s, a sum of the normalized measurement frequencies of the quantum states |k> and |k+1>, and L, a number of measurements in the ensemble of measurements.

9. The apparatus of claim 8, wherein the value estimation circuitry is configured so that computing the statistical interval and the estimated value of the real value t comprises:

computing a credible interval based on a Bernoulli process, wherein the magnitude of the amplitude of (i) the measured floor of t and (ii) the measured ceiling of t are interpreted as likelihoods for sides of a Bernoulli coin flip, wherein bias of the Bernoulli coin flip is an estimate for a decimal part of t.

10. The apparatus of claim 8, wherein the state preparation circuitry is configured so that encoding the discrete sinc quantum state representing the real value t comprises encoding a phase of an eigenvalue of a unitary operator.

11. The apparatus of claim 8, wherein the state preparation circuitry is configured so that encoding the discrete sinc quantum state representing the real value t comprises computing a result value of a function.

12. The apparatus of claim 8, wherein the state preparation circuitry is configured so that encoding the discrete sinc quantum state representing the real value t comprises computing a probability of a marked quantum state using quantum amplitude estimation.

13. The apparatus of claim 8, wherein a quantum computer comprises the state initialization circuitry, the state preparation circuitry, and the state measurement circuitry, wherein a classical computer comprises the value estimation circuitry.

14. The apparatus of claim 8, wherein a quantum computer comprises the state initialization circuitry, the state preparation circuitry, the state measurement circuitry, the value estimation circuitry.

15. An apparatus for encoding and measuring an estimated value from a discrete sinc quantum state, the apparatus comprising:

means for initializing a set of n qubits by preparing the set of n qubits in an initial quantum state;

means for encoding the discrete sinc quantum state representing a real value t, wherein amplitudes of the discrete sinc quantum state are described by an amplitude expression comprising a $\mathrm{sinc}_{\pi,n}$ function, wherein tis bounded by (k, k+1), wherein k is bounded by $[0, 2^n)$;

means for perform an ensemble of measurements of the discrete sinc quantum state to obtain a measured floor of t, a measured ceiling of t, and a ratio r of normalized measurement frequencies of quantum states |k>and |k+1>; and means for computing a statistical interval and the estimated value of t based on the measured floor of t, the measured ceiling of t, and the ratio r, wherein the means for computing the statistical interval and the estimated value of the real value t comprises:

means for computing a decimal part of t based on values of the ratio r and $2^n$, and means for computing a confidence interval for the decimal part of t using a delta method and based on the decimal part of t, the ratio r, and s, a sum of the normalized measurement frequencies of the quantum states |k> and |k+1>, and L, a number of measurements in the ensemble of measurements.

16. The apparatus of claim 15, wherein computing the statistical interval and the estimated value of the real value t comprises:

computing a credible interval based on a Bernoulli process, wherein the magnitude of the amplitude of (i) the measured floor of t and (ii) the measured ceiling of t are interpreted as likelihoods for sides of a Bernoulli coin flip, wherein bias of the Bernoulli coin flip is an estimate for a decimal part of t.

17. The apparatus of claim 15, wherein encoding the discrete sinc quantum state representing the real value t comprises encoding a phase of an eigenvalue of a unitary operator.

18. The apparatus of claim 15, wherein the means for encoding the discrete sinc quantum state representing the real value t comprises means for computing a result value of a function.

19. The apparatus of claim 15, wherein the means for encoding the discrete sinc quantum state representing the real value t comprises means for computing a probability of a marked quantum state using quantum amplitude estimation.

20. The apparatus of claim 15, wherein a quantum computer comprises the means for initializing the set of n qubits, the means for encoding the discrete sinc quantum state representing the real value t, and the means for performing the ensemble of measurements of the discrete sinc quantum state, wherein a classical computer comprises the means for computing the statistical interval and the estimated value of t.

* * * * *